United States Patent
Kim et al.

(10) Patent No.: US 10,551,719 B2
(45) Date of Patent: Feb. 4, 2020

(54) INTEGRATED QUANTUM INFORMATION PROCESSING CONTROLLED PHASE GATE

(71) Applicant: Government of the United States, as represented by the Secretary of the Air Force, Wright-Patterson AFB, OH (US)

(72) Inventors: Richard S Kim, Mason, OH (US); Attila A Szep, Bellbrook, OH (US); Michael L Fanto, Rome, NY (US); Paul M Alsing, Chittenango, NY (US); Gordon E Lott, Beavercreek, OH (US); Christopher C Tison, Boynton Beach, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 229 days.

(21) Appl. No.: 15/430,775

(22) Filed: Feb. 13, 2017

(65) Prior Publication Data
US 2018/0196331 A1    Jul. 12, 2018

Related U.S. Application Data

(60) Provisional application No. 62/445,319, filed on Jan. 12, 2017.

(51) Int. Cl.
G02F 3/00      (2006.01)
G02F 1/01      (2006.01)
(Continued)

(52) U.S. Cl.
CPC .............. *G02F 3/00* (2013.01); *G02F 1/0136* (2013.01); *G02F 1/3133* (2013.01); (Continued)

(58) Field of Classification Search
CPC ........ G02F 1/0136; G02F 1/3133; G02F 3/00; G02F 2201/12; G02F 2202/20; G06N 10/00
See application file for complete search history.

(56) References Cited

U.S. PATENT DOCUMENTS 4,042,814 A * 8/1977 Taylor .................... G06E 1/04
                                                    708/191
4,157,860 A * 6/1979 Marcatili .............. G02F 1/3132
                                                    359/245
(Continued)

FOREIGN PATENT DOCUMENTS

WO       2008107852 A1     9/2008

OTHER PUBLICATIONS

Kiesel et al., "Linear Optics C-Phase gate made simple," Physics Review Letters (PRL) 95, 210505, 2005.
(Continued)

*Primary Examiner* — William R Alexander
*Assistant Examiner* — Balram T Parbadia
(74) *Attorney, Agent, or Firm* — AFMCLO/JAZ; Adam G. Pugh

(57) ABSTRACT

An electro-optical directional coupler is provided having a substrate and a first and second optical waveguide formed on the substrate, where the second waveguide extends adjacent to and parallel with the first waveguide for at least one interaction length. The interaction length has a first end and a second end such that an optical signal applied only to one of the first and second waveguides couples to the other of the first and second waveguides between the ends. A first electrode is proximate the first and second waveguides and between the ends of the interaction length. A first voltage applied to the first electrode independently tunes a coupling of a TE mode. A second electrode located proximate the first and second waveguides and the first electrode and between
(Continued)

the ends of the interaction length. A second voltage applied to the second electrode independently tunes a coupling of a TM mode.

11 Claims, 21 Drawing Sheets

(51) Int. Cl.
*G02F 1/313* (2006.01)
*G06N 10/00* (2019.01)

(52) U.S. Cl.
CPC ...... *G02F 2201/12* (2013.01); *G02F 2202/20* (2013.01); *G06N 10/00* (2019.01)

(56) References Cited

U.S. PATENT DOCUMENTS

| | | | |
|---|---|---|---|
| 4,291,939 A * | 9/1981 | Giallorenzi | G02F 1/225 359/245 |
| 4,863,247 A * | 9/1989 | Lasher | G06E 1/04 359/108 |
| 4,871,223 A * | 10/1989 | Auracher | G02F 1/225 385/2 |
| 5,867,615 A * | 2/1999 | Shi | G02F 1/011 385/1 |
| 7,373,059 B2 | 5/2008 | Spillane et al. | |
| 8,280,250 B2 | 10/2012 | Brodsky et al. | |
| 8,995,797 B2 | 3/2015 | Smith et al. | |
| 9,075,282 B2 | 7/2015 | Smith et al. | |
| 9,077,457 B1 | 7/2015 | Smith et al. | |
| 9,083,473 B1 | 7/2015 | Smith et al. | |
| 9,158,175 B2 | 10/2015 | Kung et al. | |
| 9,264,148 B2 | 2/2016 | Smith et al. | |
| 9,274,274 B1 | 3/2016 | Xu et al. | |
| 2008/0075410 A1 * | 3/2008 | Spillane | B82Y 10/00 385/122 |
| 2009/0028340 A1 | 1/2009 | Trifonov | |
| 2014/0126030 A1 * | 5/2014 | Crespi | B82Y 10/00 359/108 |
| 2015/0029568 A1 | 1/2015 | Smith et al. | |
| 2015/0029569 A1 | 1/2015 | Smith et al. | |
| 2015/0036967 A1 | 2/2015 | Smith et al. | |
| 2015/0077821 A1 | 3/2015 | Smith et al. | |
| 2015/0262072 A1 | 9/2015 | Stoltz | |

OTHER PUBLICATIONS

Corey et al., "Multiple-Entangled Photon Source for Cluster State Generation," Proc. of SPIE vol. 8400 84000Z-1, 2012.
Strake, et al., J. of Lightwave Technology 6, p. 1126, 1988.
Korotky, et al., J of Quantum Electronics 18, p. 1704, 1982.
Nishihara et al., Optical Integrated Circuits, pp. 96-109, McGraw-Hill Book Company 1989.

* cited by examiner

| POLARIZATION | POWER SPLITTING RATIO | COUPLER LENGTH, L | INTEREST POINTS |
|---|---|---|---|
| TE | 0% : 100% | 493.74 μm | |
| | 50% : 50% | 1540.0 μm | |
| | 100% : 0% | 2605.6 μm | |
| | 50% : 50% | 3643.2 μm | |
| | 0% : 100% | 4708.3 μm | |
| | 33% : 66% | 1320.1 μm | |
| | 66% : 33% | 1770.0 μm | |
| | 66% : 33% | 3413.6 μm | |
| | 33% : 66 % | 3863.5 μm | |
| TM | 0% : 100% | 558.02 μm | |
| | 50% : 50% | 1641.5 μm | |
| | 100% : 0% | 2734.1 μm | (O) |
| | 50% : 50% | 3799.2 μm | |
| | 0% : 100% | 4901.1 μm | |
| | 100% : 0% | 7092.0 μm | |
| | 33% : 66% | 1421.1 μm | |
| | 66% : 33% | 1889.4 μm | |
| | 66% : 33% | 3551.3 μm | |
| | 33% : 66 % | 4038.0 μm | (O) |

FIG. 6

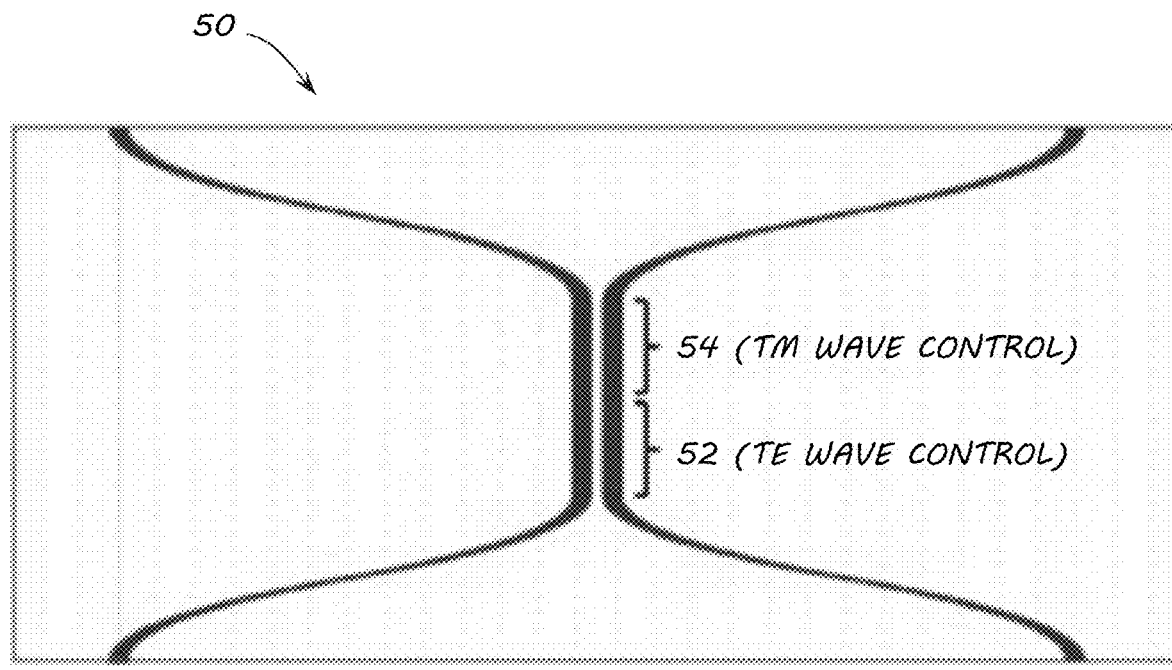
FIG. 14
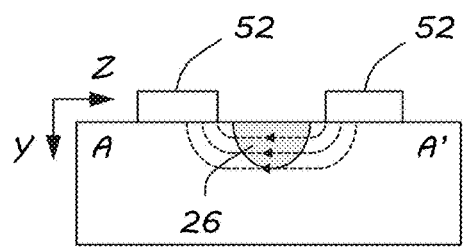
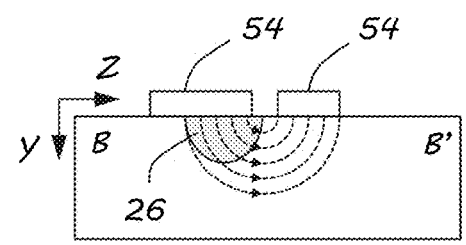
FIG. 15A
FIG. 15B

HORIZONTAL E-FIELD

VERTICAL E-FIELD

INTEGRATED QUANTUM INFORMATION PROCESSING CONTROLLED PHASE GATE

CROSS-REFERENCE TO RELATED APPLICATIONS

This application claims the benefit of and priority to U.S. Provisional Application Ser. No. 62/445,319, entitled "Integrated Quantum Information Processing Controlled Phase Gate," filed on Jan. 12, 2017, the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention generally relates to quantum gates and, more particularly, to controlled quantum gates.

Description of the Related Art

Entangled quantum states of light are in great demand in contemporary quantum technology. Photonic quantum information processing, and metrology are all based on exploiting special properties of non-classical multipath entangled states. Due to their high robustness against decoherence, and relatively simple manipulation techniques, photons are often exploited as the primary carriers of quantum information. A generally accepted encoding scheme using photons is dual rail encoding, in which logical qubit states $|\uparrow\rangle$ and $|\downarrow\rangle$ are encoded in two-mode Fock states $|1, 0\rangle$ and $|0,1\rangle$, respectively. In experimental photon implementations, these two modes are commonly associated with horizontal and vertical polarizations. An attractive feature of such an encoding is that single-qubit operations may be performed by the standard techniques of linear optics, using practically lossless beam splitters and phase shifters. However, when it comes to entangling photon-encoded qubits, a problem immediately arises: the absence of a photon-photon interaction for coupling the photons.

Optical Kerr nonlinearity can effectively couple photons through their interaction with a dispersive medium. However, due to the low photon numbers involved in typical quantum-information processing tasks, such nonlinearity is extremely weak and is of little practical use. Alternatively, an effective photon-photon interaction may be produced using ancilla modes and projective measurements. A quantum state generator can then be realized utilizing only linear-optical elements (beam splitters and phase shifters) in combination with photon counters, at the expense of the process becoming probabilistic. Knill, Laflamme, and Milburn (KLM) discovered that such a device is capable of transforming an initially separable state into entangled state. Since the transformation depends on the success of the measurement, the transformation has a probabilistic nature.

The paradigm of quantum computation is based on peculiar laws of quantum mechanics, which potentially allow manipulation and processing of information at exponentially faster rates as compared to classical computers. There exist at least two distinct schemes of implementing quantum computation. Historically the first scheme is based on the sequential application of a number of logical gates to elementary carriers of quantum information (qubits). A second scheme does not have a classical counterpart. Rather, it exploits the purely quantum phenomenon of wave function collapse under a measurement. A computation is performed by inducing non-unitary dynamics in a carefully prepared quantum state of multiple mutually entangled qubits by applying a sequence of measurements according to a desired computational algorithm. Such quantum states are called cluster states or, more generally, quantum graph states.

Since the cluster state paradigm offers better possibilities for error correction this scheme became the leading candidate for the physical realization of quantum information processing. From a physical point of view, photon based implementations of cluster states, where information is encoded in wave functions of single photons, has important advantages compared to other technologies.

Realizing a quantum computer is one of the most desirable goals in quantum information science, in which engineering photon entanglement is a key capability to implement the quantum system. According to contemporary research for qubits, entangling gates such as the C-phase gate or the CNOT together with single qubit operations are sufficient to create any kind of quantum network.

Cluster states generated by a Schioedtei assembly play a central role in a measurement-based one-way quantum computation approach. In this scheme, the entanglement resource is provided in advance through an initial, highly entangled multi-qubit cluster state and is consumed during the quantum computation by means of single-particle projective measurements. The feedforward nature of the one-way computation scheme renders the quantum computation deterministic, and removes much of the massive overhead that arises from the error encoding used in the standard quantum circuit computation model. FIG. 1 illustrates a scheme 10 for utilizing the output of a Schioedtei assembly to generate a four photon cluster state, $|C\rangle_4$. This particular example employs the spots 1,2,3,4 and requires insertion of two half-wave plates 12, a SWAP gate 14 and a controlled-phase (C-Phase) gate 16. This scheme could be expanded to include the other eight spots to generate even larger cluster states.

A controlled phase (C-phase) gate has also been introduced, which uses a combination of first and second order interference to obtain C-phase operation in 1/9 of the gates. Since the first-order interference requires stability of the setup on the order of less than the photon's wavelength, for multiphoton experiments more simple and stable implementations clearly are desirable.

SUMMARY OF THE INVENTION

Embodiments of the invention address the need in the art by providing a C-phase gate including novel electro-optical directional couplers, which may be applicable to applications of quantum information science dealing with controlling entangled photons. Embodiments of the electro-optical directional coupler may be designed for simultaneous switching function of TE and TM polarizations having two optical waveguides with multiple electrodes formed on electro-optic materials such as Lithium Niobate, EO polymer, and QD/QW III-V substrates, where entangled photon switching and modulation may be affected by changing the propagation constant of one of the waveguides by means of horizontal and vertical electric fields applied to the waveguides.

Specifically, embodiments of the invention provide an electro-optical directional coupler, which includes a substrate, a first optical waveguide formed on the substrate and a second optical waveguide formed on the substrate. The second optical waveguide extends adjacent to and parallel with the first optical waveguide for at least one interaction length. The interaction length has a first end and a second end such that an optical signal applied only to one of the first and second optical waveguides couples to the other of the first and second optical waveguides between the first end and second end. The electro-optical directional coupler further includes a first electrode proximate the first and second optical waveguides and positioned between the first end and second end of the interaction length such that a first voltage applied to the first electrode independently tunes a coupling of a TE mode. The electro-optical directional coupler still further includes a second electrode proximate the first and second optical waveguides and the first electrode and positioned between the first end and second end of the interaction length such that a second voltage applied to the second electrode simultaneously and independently tunes a coupling of a TM mode.

The electrodes associated with the embodiments of the invention may encompass multiple configurations. For example, one exemplary configuration of an electrode may include a first voltage source and a second voltage source. The first and second voltages sources are positioned on the substrate such that the first and second optical waveguides are between the first and second voltage sources, which produces a horizontal electric field across the first and second optical waveguides. An alternate exemplary configuration of an electrode may include a first voltage source, a second voltage source, a third voltage source, and a fourth voltage source. The second and third voltages sources are positioned on the substrate such that the second and third voltage sources are between the first and second optical waveguides. The first and fourth voltages are positioned on the substrates such that the first and second optical waveguides and the second and third voltage sources are between the first and fourth voltage sources, which produces horizontal electric fields across the first and second optical waveguides.

Another alternative exemplary configuration of an electrode may include a first voltage source, a second voltage source, and a third voltage source. The first voltage source is positioned on the substrate above the first and second optical waveguides. The second and third voltage sources are positioned on the substrate such that the first and second optical waveguides and the first voltage source are between the second and third voltage sources, which produces a vertical electric field across the first and second optical waveguides. Still another alternate exemplary configuration of an electrode may include a first voltage source, a second voltage source, a third voltage source, and a fourth voltage source. The second and third voltage sources are positioned on the substrate above the first and second optical waveguides respectively. The first and fourth voltages are positioned on the substrate such that the first and second optical waveguides and the second and third voltage sources are between the first and fourth voltage sources. The first and fourth voltage sources have the same polarity and the second and third voltage sources have the same polarity, which produces vertical electric fields across the first and second optical waveguides.

In a quantum information processing C-phase gate, there are generally three coupler elements, which each contain at least two waveguides. The electro-optical directional couplers, consistent with the embodiments of the invention, may be connected in a form of a cascaded integrated circuits on a EO substrate in order to perform a simultaneous polarization switching with a particular weighting ratio of optical power by the sets of electrodes on the couplers for applying a vertical and horizontal electric field to the waveguides.

Specifically, three C-Phase Gate utilizing the electro-optical directional coupler embodiments of the invention may be cascaded such that a first input and a second input of a first electro-optical directional coupler are configured to receive one or more input signals. A first output of the first electro-optical directional coupler may be connected to a second input of a second electro-optical directional coupler, and a second output of the first electro-optical directional coupler may be connected to a first input of a third electro-optical directional coupler. Each of the TE and TM modes may be simultaneously and independently controlled on each of the three electro-optical directional couplers. For example, electrodes on each of the three electro-optical directional couplers may be configured to independently produce a horizontal E-field through their respective optical waveguides. In a specific illustrated embodiment, the horizontal E-field produced in the first electro-optical directional coupler may result in a % T of H=100% and the horizontal E-fields produced in the second and third electro-optical directional couplers may result in a % T of H=33%. Additionally, electrodes on each of the three electro-optical directional couplers may be configured to produce a vertical E-field through the respective optical waveguides. Again, in a specific illustrated embodiment, the vertical E-field produced in the first electro-optical directional coupler may result in a % T of V=33% and the vertical E-fields produced in the second and third electro-optical directions couplers may result in a % T of V=100%.

In addition to the C-phase gate and electro-optical directional couplers above, embodiments of the invention also provide a method of tuning an electro-optical directional coupler having a first and second optical waveguide positioned on a substrate where the second optical waveguide extends adjacent to and parallel with the first optical waveguide for at least one interaction length. In this method, a first voltage is applied to a first electrode proximate the first and second optical waveguides and positioned between a first end and a second end of the interaction length such that the first voltage applied to the first electrode tunes a coupling of a TE mode. A second voltage is applied to a second electrode proximate the first and second optical waveguides and the first electrode and positioned between the first end and second end of the interaction length such that the second voltage tunes a coupling of a TM mode. These two voltages are iteratively adjusted to independently achieve desired coupling ratios to the TE mode and the TM mode. For example, the desired coupling rations include may include combinations of TM:100%:0%, TM:33%:66%, TE:100%; 0%, and TE:33%,66%.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 6 contains a table providing a summary of optical power splitting ratios;

FIG. 14 is a schematic representation of a two-section electrode directional coupler;

FIGS. 15A and 15B are cross sections of the two-section electrode of FIG. 14;

Figure 1:
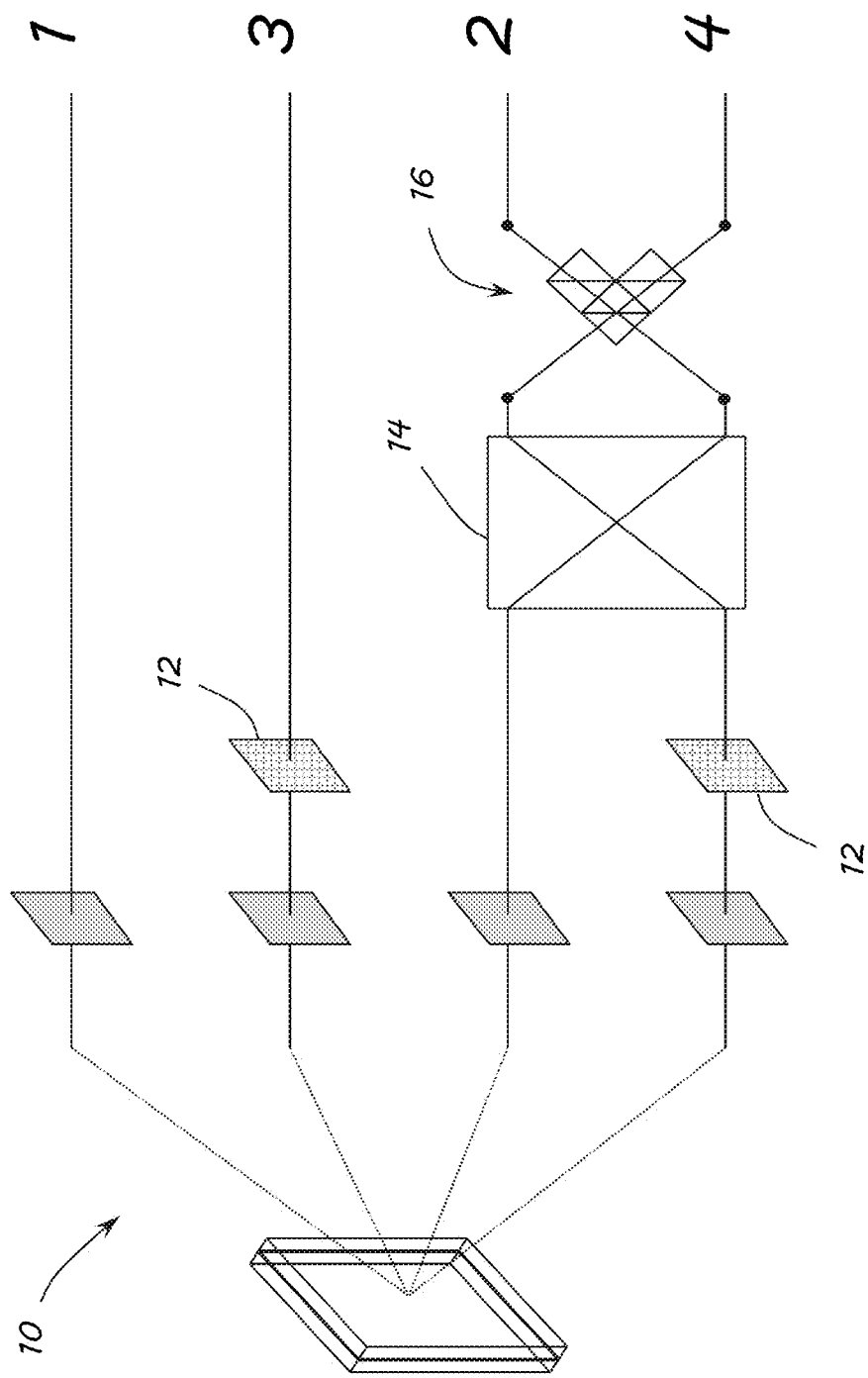
FIG. 1 is a Linear Cluster State Generation Scheme.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

There are many characteristics of quantum particles that can be used to generate entanglement such as spin, angular orbital momentum etc., but polarization and phase are most commonly chosen because of the ease of manipulation by optical devices. These optical devices generally include optical switches, routers, multimode interference devices, arrayed waveguides, directional couplers, symmetric and asymmetric x and y junctions, filters, interferometers and the like. These devices generally utilize various physical phenomena that are material specific such as phonon vibrations, electro optic effect, thermo optic effect, absorption, various nonlinear effects etc. Many of these phenomena are wavelength specific as well. The detection of entangled or single quantum particles such as photons is also a factor to consider when selecting the right devices and materials because of the efficiency of such detectors. Contemporary cost effective room temperature single photon detectors are most efficient at the 800-850 nm range. An exemplary of material for use with optical devices is $LiNbO_3$. This material is generally a low loss electro optic material suitable for high speed implementation of most of the devices listed above.

Embodiments of the invention address the need in the art by providing electro-optical waveguide geometries generally, and especially electro-optically controlled directional coupler switch-modulators, that utilize the effect of the applying electric fields on the TE and TM polarizations propagating through optical waveguides implemented on, for example, an electro-optic lithium niobate substrate, though other materials that have electro-optic effects such as InP, GaAs semiconductor or electro-optic polymers may also be used.

Embodiments of the invention further address the need in the art by providing an integrated electro-optical photonic circuit version of a quantum information processing C-phase gate. Enhancement of the switching function for both TM and TE polarizations due to stability and compactness occur by tuning of the electric field applied to the electrodes with respect to the electro-optic lithium niobate optical waveguide. An exemplary embodiment of the invention may be implemented as an electro-optical waveguide switching device having two segments of electrodes, Titanium in-diffused Lithium Niobate optical waveguides, and a coupling structure for simultaneously switching of TM and TE polarizations with variable splitting ratios. This coupling structure may be formed with a pair of electrode sections along with the two coupling waveguides. The two segments of electrodes introduce different sets of electric fields providing horizontal and vertical electric fields through two waveguide channels, which are used to control the desired power in each output waveguide when orthogonally polarized TM and TE modes are inserted at the input port.

In the exemplary embodiment, a single Y-cut monocrystalline wafer of electro-optical material forms a substrate of a C-phase gate. Waveguides of Lithium Niobate may be diffused into the wafer to form optical waveguides such that light propagates in the X-direction through a particularly designed and cascaded optical directional coupler where individual components' refractive indices are controlled by electrodes formed closely adjacent to the waveguide coupler.

A magnitude of an index of refraction may be changed by applying an external electric field on the lithium niobate crystal. This property has contemporarily been utilized for modulation and switching of guided integrated optical devices. Selection of proper crystal orientation is a prerequisite for successful operation of electro-optically controlling devices because the electro-optic effect is anisotropic. In channel waveguides, there exist two orthogonal propagations which are predictably definite. Especially, in isotropic waveguides and anisotropic dielectric waveguides, the Eigen mode polarization is either mainly parallel or mainly perpendicular to the waveguide surface. As a result, for beam coupling from fiber to channel waveguides, the beam from the fiber generally excites both orthogonal modes with each having different polarization. Since the electro-optic effect is anisotropic in general, one polarization mode experiences greater electro-optic effect via index change than the other. This implies that there is a possible structure that can control each polarization by employing two different electrodes on single waveguide geometry.

Single Optical Waveguide and Simulation

Some embodiments of the invention use titanium in-diffused optical waveguides to guide the optical signal. Other embodiments may also use semiconductor III-V materials such as InP or GaAs or a hybrid SOI (silicon-on-insulator) optical waveguide integrated with III-V materials. Generally semiconductor based optical waveguide geometry has a very small footprint such that the quantum information optical structure may be effectively built on. Additionally, low-loss electro-optic polymer optical waveguides may also be an appropriate platform. When determining waveguide design that is optimized for a single mode operation at a desired wavelength (wavelength of 810 nm, for example). Waveguide fabrication parameters of titanium thickness, the width of the titanium strip, diffusion temperature, diffusion time, and diffusion environment may be determined through device simulations and experimental routes. The waveguide simulation may be carried out using, for example, BeamPROP™, a commercial mode solver by RSoft Corporation, and its titanium diffusion model. Working with an 810 nm wavelength, the computed Eigen mode as the effective refractive index remains the same. The Eigen mode was verified to be small enough in mode size to ensure efficient coupling to the small core fiber and keep an effective mode evolution in an active section during the switching operation. Optimum parameters of the titanium in-diffused optical waveguides were simulated based on beam propagation method (BPM), and were identified in order to realize the integrated photonic circuits for quantum information C-phase gates below. In an illustrated embodiment being operated at 810 nm, the parameters are: diffusion temperature approximately 1000~1050° C., titanium thickness approximately 350~583 Å, titanium waveguide width about 4 μm wide, and diffusion time about 5 hrs. By changing the waveguide parameters like titanium metal width, diffusion temperature, diffusion time, and diffusion atmosphere for other target wavelengths, the optical waveguide index and diffusion depth can be effectively controlled.

Design of C-Phase Gate Based on Optical Directional Couplers

Figure 2:
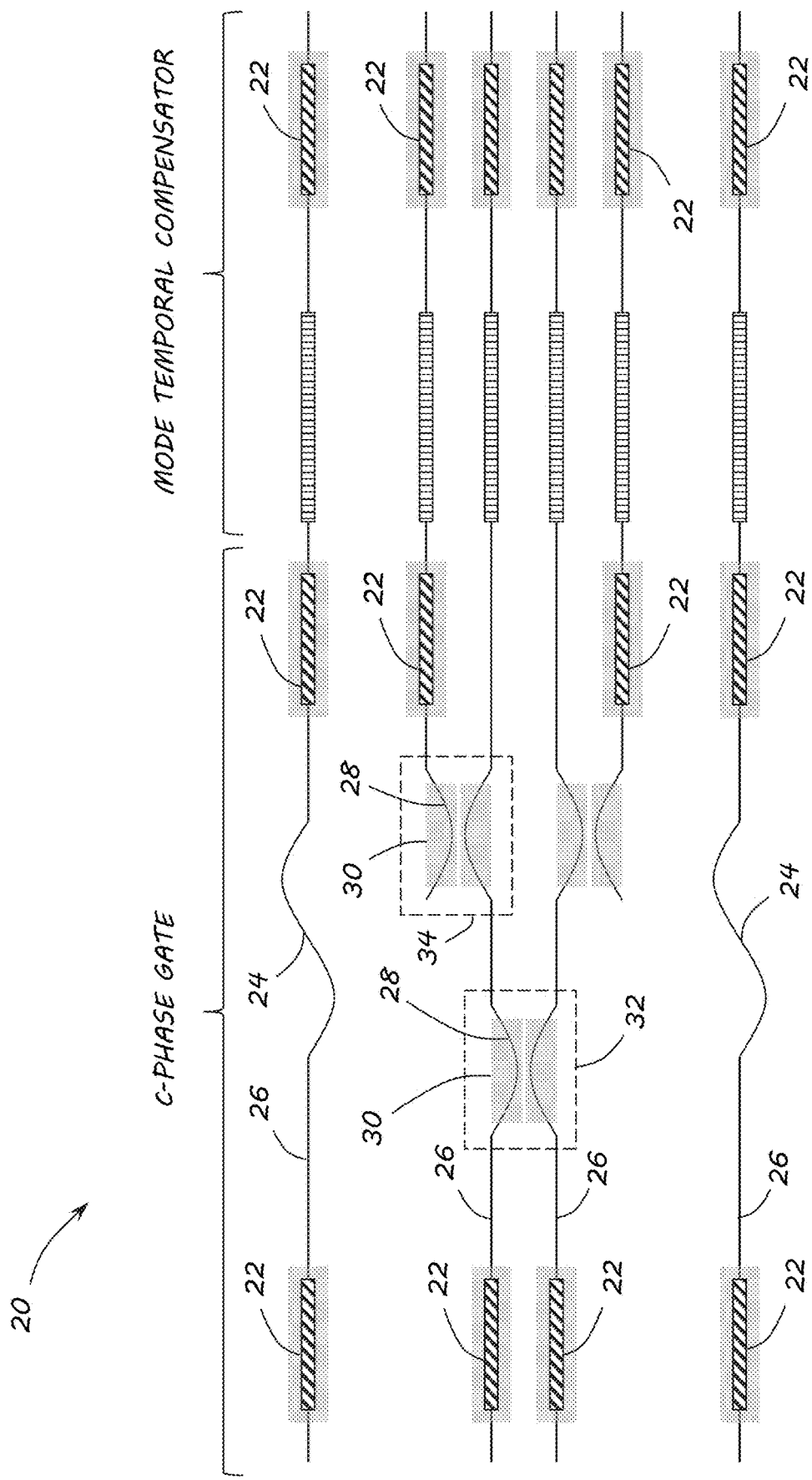
FIG. 2 is a C-phase gate for Cluster State Generation.
Figure 3A:
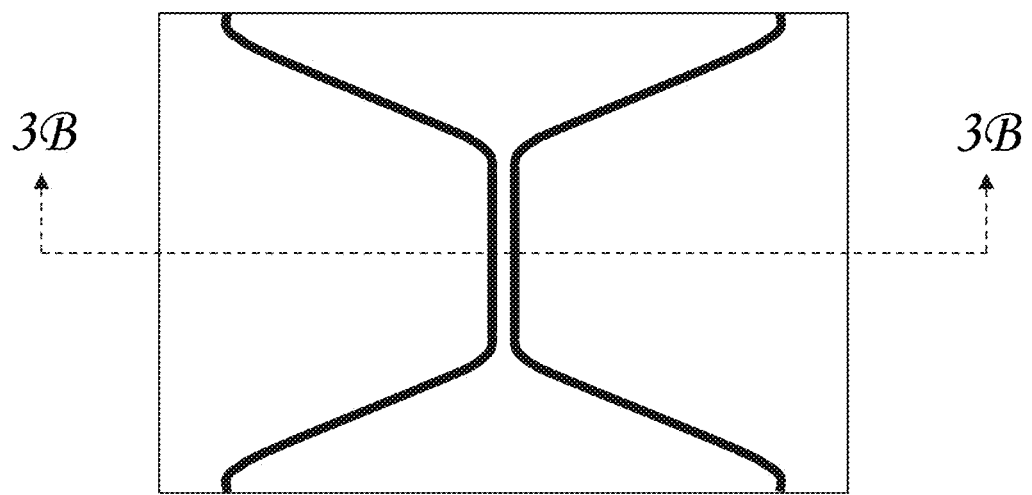
FIG. 3A is a schematic diagram of an optical directional coupler.
Figure 3B:
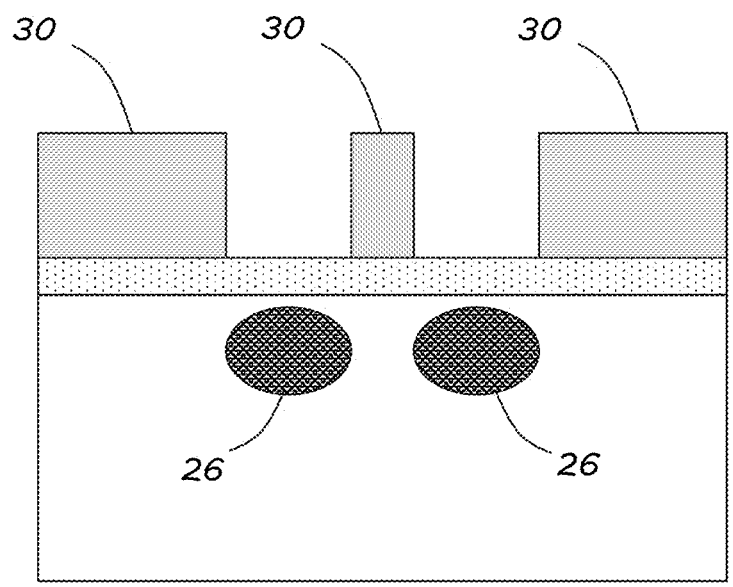
FIG. 3B is a schematic diagram of an electrode configuration for the optical directional coupler in FIG. 3A.
Figure 4:
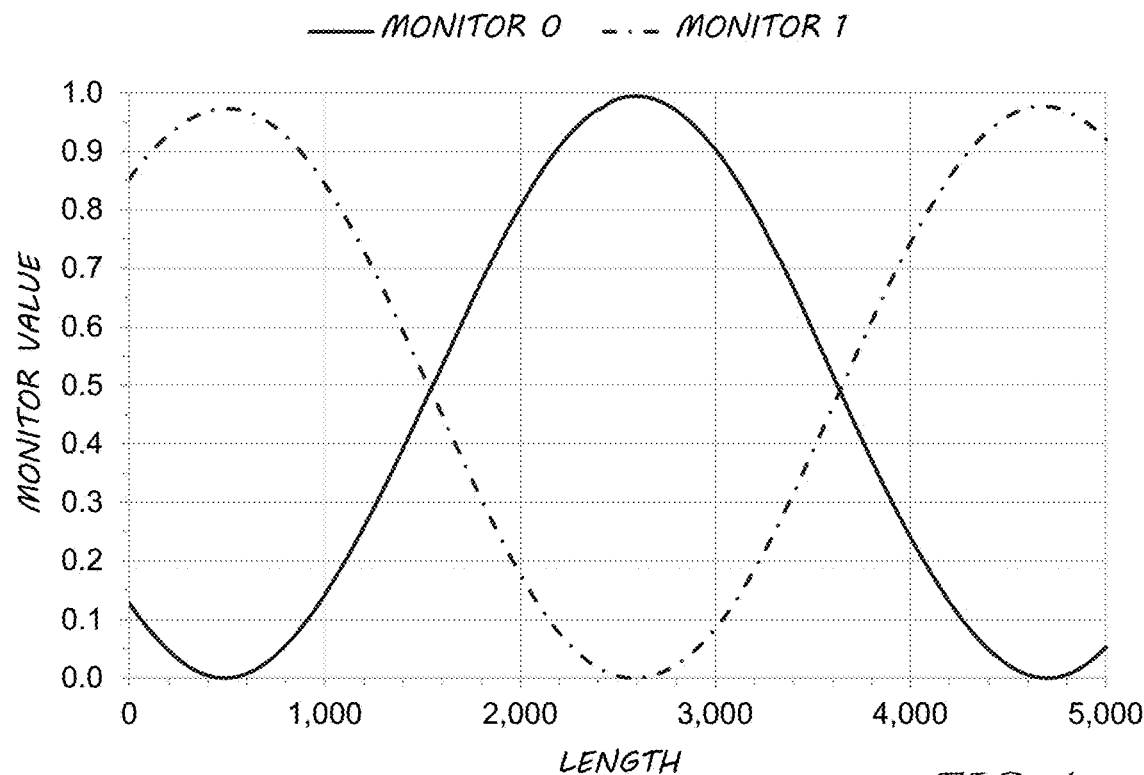
FIG. 4 contains a graph of a transfer function of the directional coupler as a function of interaction length for TE polarization.
Figure 5:
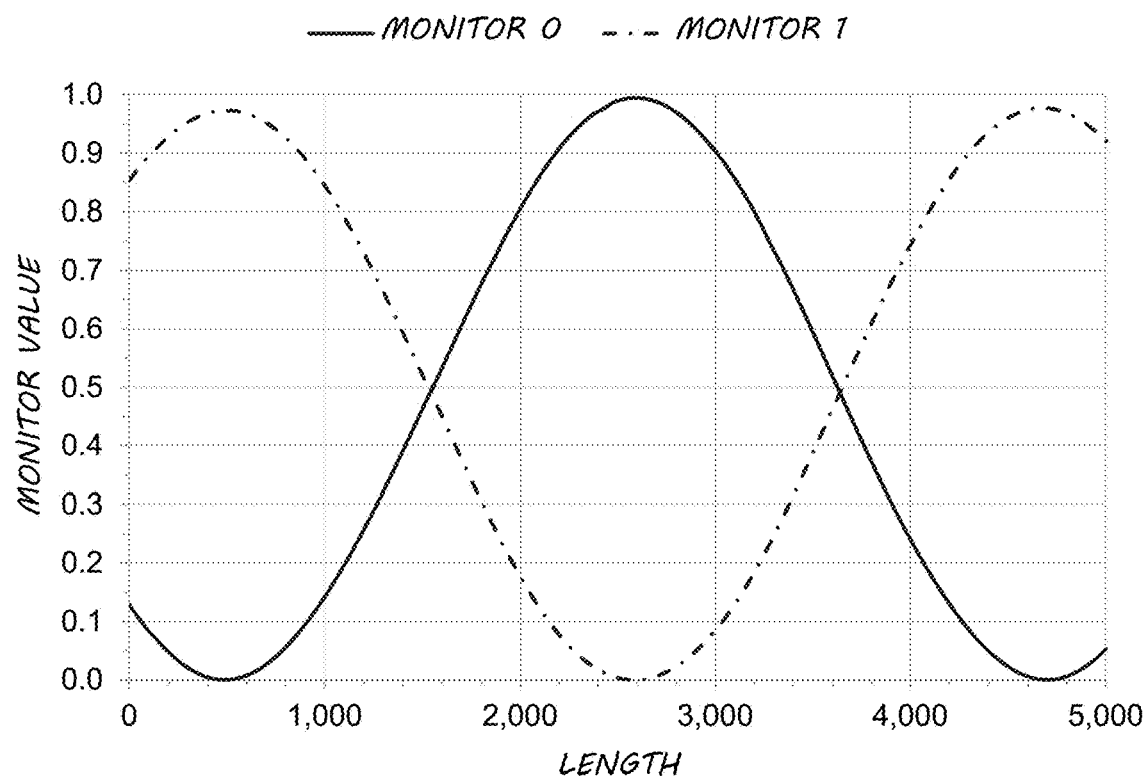
FIG. 5 contains a graph of a transfer function of the directional coupler as a function of interaction length for TM polarization.

Cluster states in quantum integrated circuits may be generated from polarization based entangled photon pairs by further manipulating the polarization and phases of the pairs and rearranging them in a controlled fashion as illustrated in FIG. 2. An exemplary C-phase Gate circuit 20 includes phase shifters 22, delay lines 24, power distribution network waveguides 26, directional couplers 28 having different weighting factors for their outputs, and electrodes 30. There are two different directional couplers 32, 34 that requires different functions: for example, the first directional coupler 32 has TE % T:% R=100:0 and TM % T:% R=33:66, and the second directional coupler 34 has TE % T:% R=33:66 and TM % T:% R=100:0, respectively. Switches may be used in the control circuit that can route various signals, both horizontally polarized-transverse electric (TE) and vertically polarized transverse magnetic (TM), at the same time. These switches perform the routing as well as supply additional weighting factors for the two polarizations. In this illustrated embodiment, Lithium Niobate crystals were again chosen for the circuits, as this material is low loss and it possesses high electro optic coefficients for fast re-configurability if dynamic control becomes necessary. FIGS. 3A and 3B illustrate one simple configuration of the components in an integrated waveguide platform. For TE polarization, the ordinary index of refraction was chosen to be 2.1748, and the change in the refractive index of the waveguide core region was chosen to be 0.001779 (the same to TM polarization) that was already estimated from a BPM simulation for maximizing an optimum fiber-to waveguide coupling. FIG. 4 depicts an optical power transfer function of the directional coupler while varying the length of the coupler section. From this transfer function, some particular output points such as TE 0%, 50%, and 100% can be found as follows: TE 0% at L=493.74 μm and L=4708.3 μm, TE 50% at L=1540 μm and 3643.2 μm, and TE 100% at L=2605.6 μm. From this simulation, the coupling length was calculated to be 2107 μm for TE polarization working at 810 m wavelength. For TM polarization as depicted in FIG. 5, the ordinary index of refraction was chosen to be 2.540, and the change in the refractive index of the waveguide core region was chosen to be 0.001779. The calculated coupling length for TM polarization was estimated to be 2172 μm.

The table in FIG. 6 provides a summary of optical power splitting ratios of a directional coupler based on a 5-5-5 μm system. The directional coupler, in this illustrated embodiment, includes one-section electrode having a push-pull driving configuration. The table in FIG. 6 summarizes several waveguide lengths showing a set of particular optical power splitting ratios for both TE and TM modes. In order to effectively construct a directional coupler that is capable of controlling two polarizations at the same time, the physical geometry of the optical directional coupler may be made first based on parameters determined for TM polarization. For the case of the illustrated embodiment using Y-cut Lithium Niobate, the electro-optic dielectric tensor for TM mode control is significantly lower (one third) than that of TE mode.

One of the coupling lengths in the directional coupler showing the weighting factor of TM=100%:0% from the table in FIG. 6 may be selected for constructing the directional coupler. For example, a coupling length of about 2730 μm might be selected, which should yield a splitting ratio of TM=100%:0%. As evidenced by the curves in FIG. 4, the TM polarization may be controlled to have the output weighting of 100%:0% ratio. However, when this condition is applied to TE polarization, the power splitting ratio will be need to be determined. The power splitting ratio is almost the same for the case in TE polarization. This is due to the index change after Ti in-diffusion under no applied voltage, which is almost the same in both cases as evidenced in the graphs in FIGS. 7 and 8. The index of refraction used for this illustrated embodiment for TE polarization is $n_e=2.1748$ with an interaction length of 2730 μm.

Figure 7:
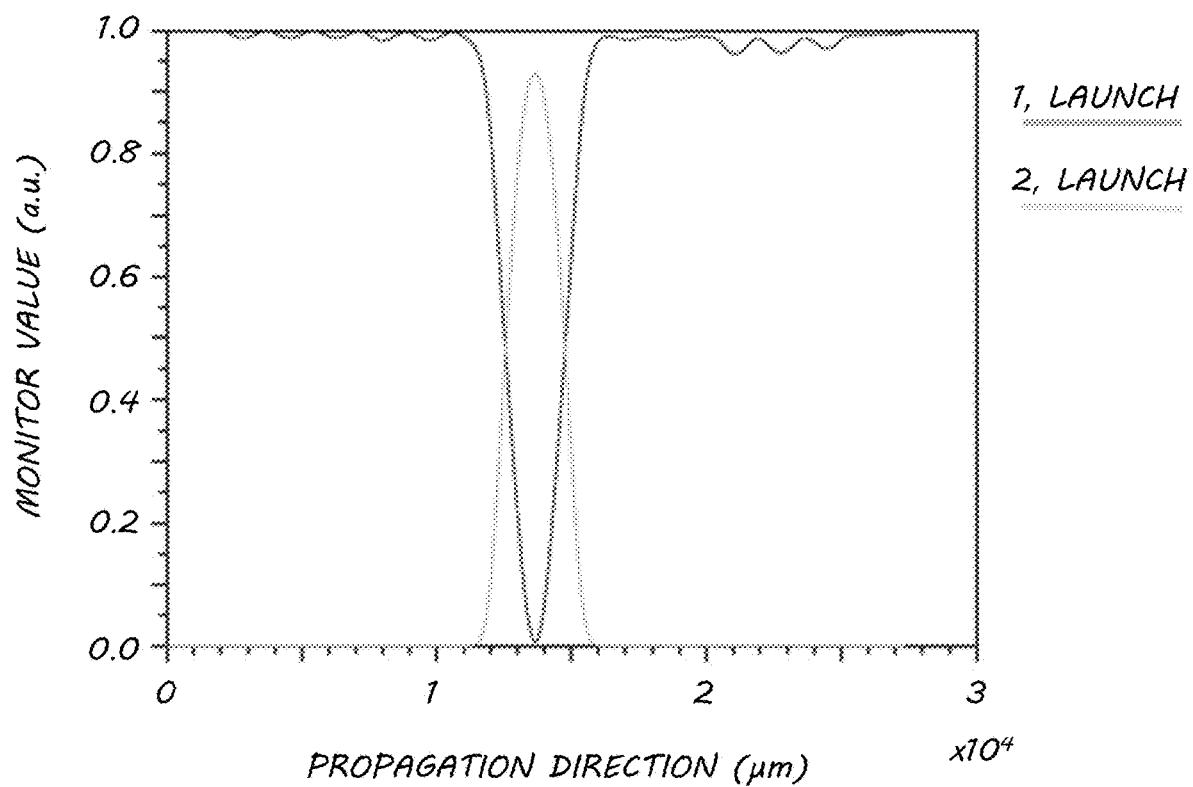
FIG. 7 contains a graph of monitor value vs. propagation direction for TM mode propagation.
Figure 8:
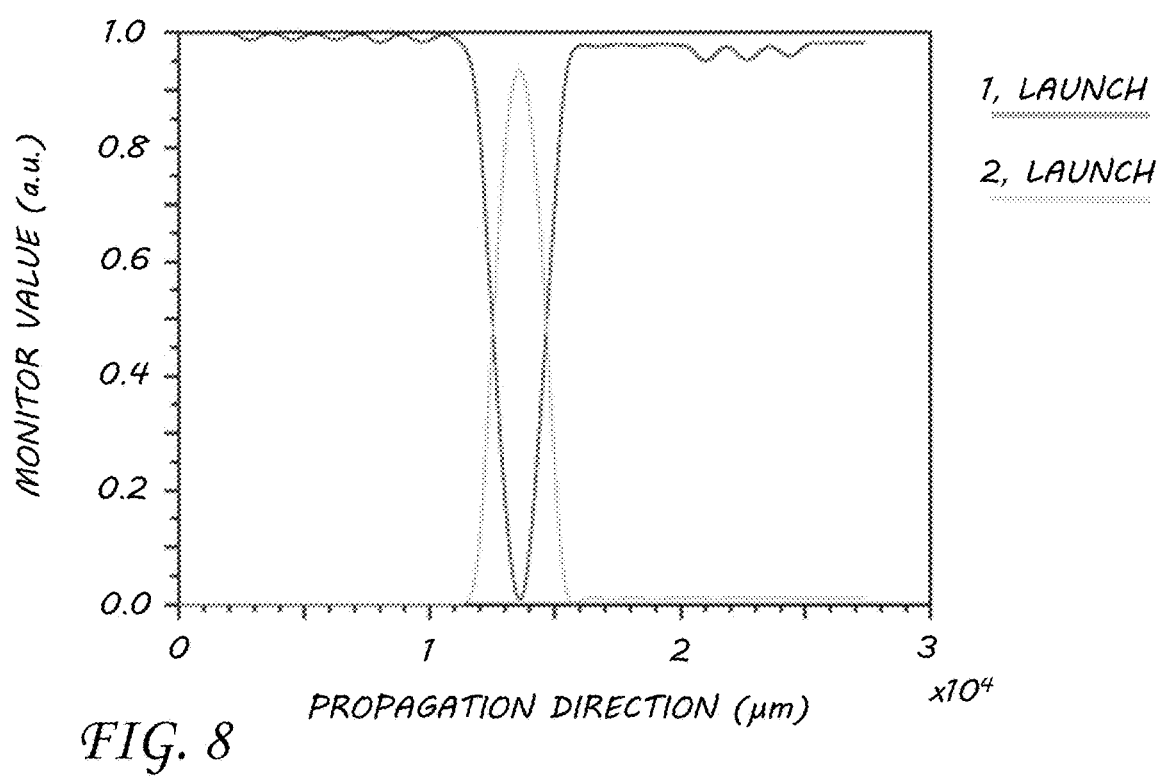
FIG. 8 contains a graph of monitor value vs. propagation direction for TE mode propagation.
Figure 9:
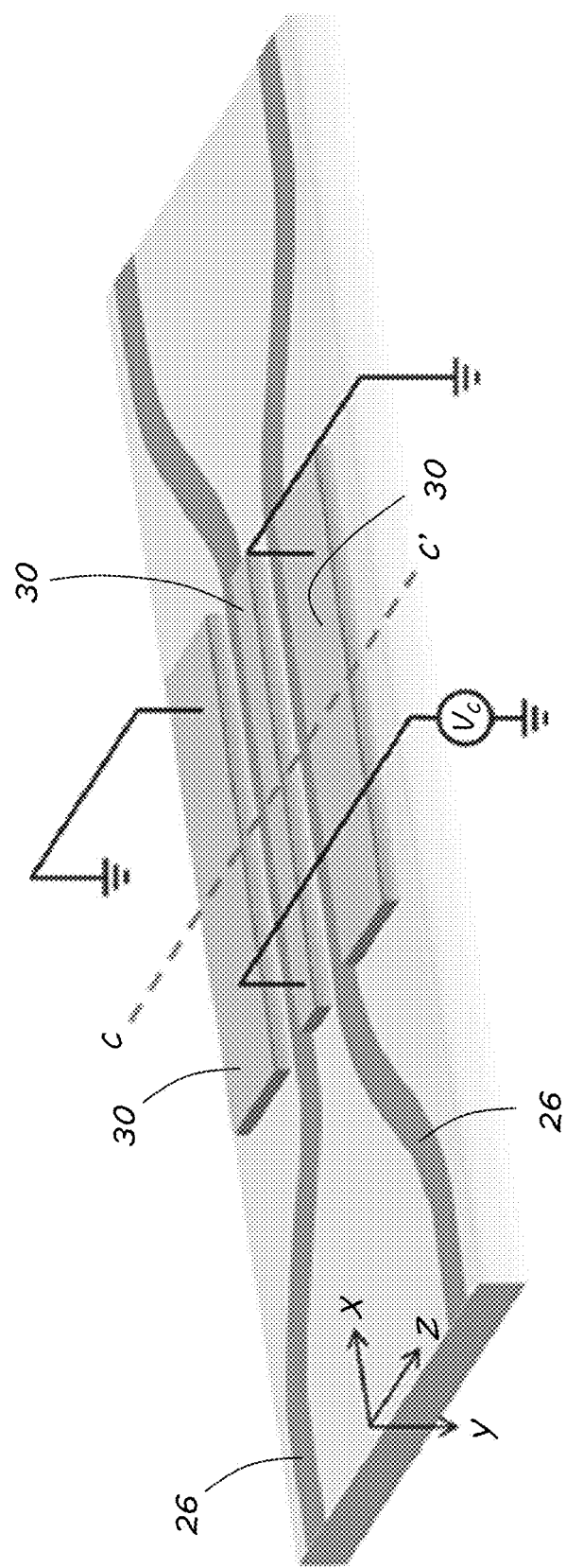
FIG. 9 is a representation of an exemplary directional coupler with push-pull electrode geometry.
Figure 10A:
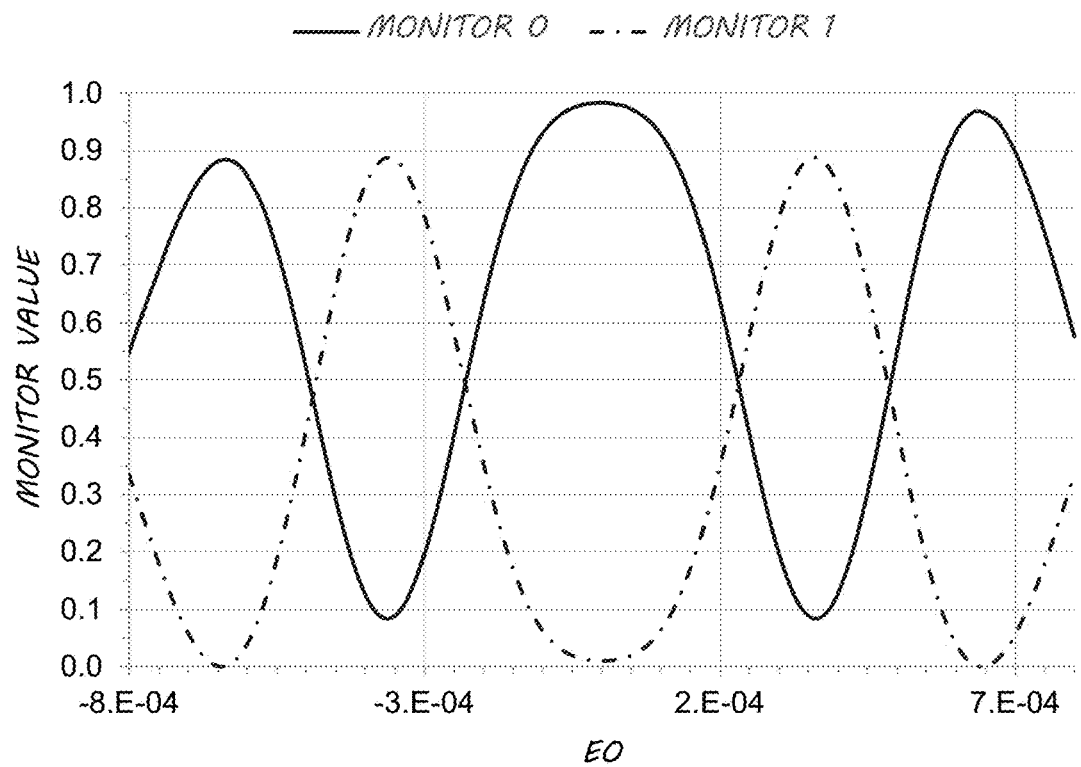
FIG. 10A contains a graph of a transfer function of the directional coupler of FIG. 9 with varying applied voltages.
Figure 10B:
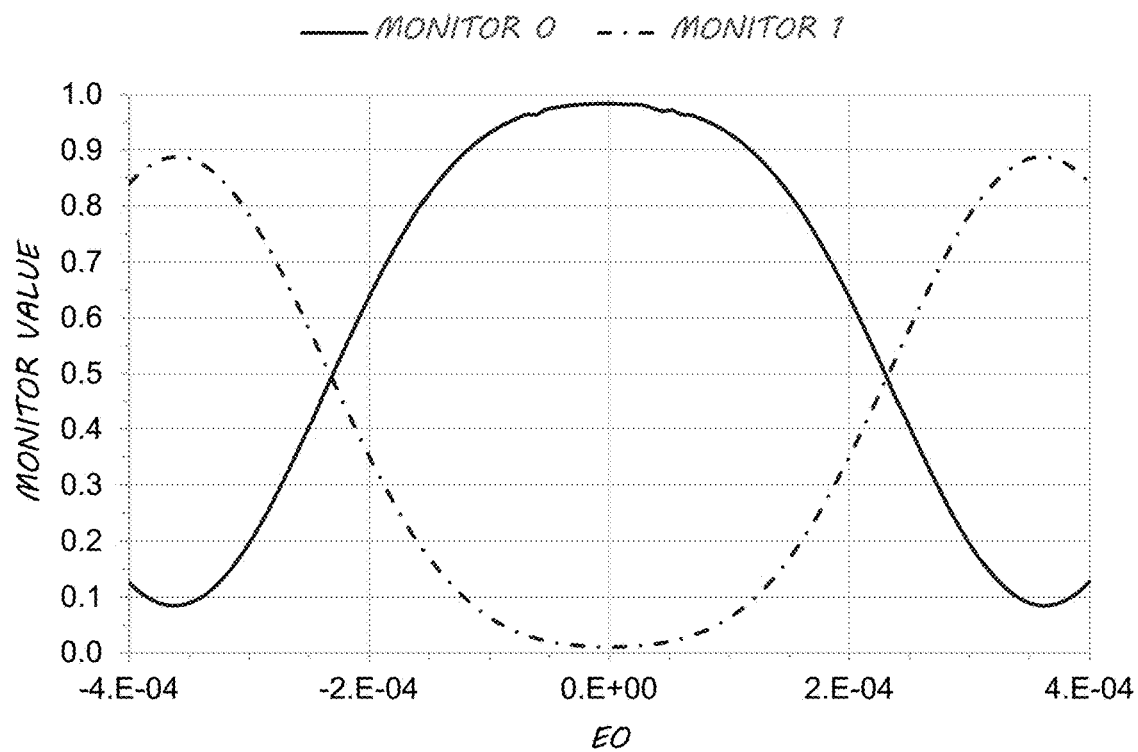
FIG. 10B contains a portion of the graph of FIG. 10A.

Based on the simulation results that are shown in FIGS. 5 and 7, a model of the directional coupler may be constructed and is illustrated in FIG. 9. The switching ratio of TM polarization is set to be 100%:0% with an interaction length of 2730 μm. By assuming the electric field in the z-axis does not affect to the TM polarization, which is along the x-axis, the optical transfer function as a function of applied voltage may be evaluated as shown in FIGS. 10A and 10B. The optical transfer function corresponds to the index change of the core region (stated as "EO" on the x-axis). This results in only variation of TE polarization when the directional coupler is made on a Y-cut X-propagating Lithium Niobate substrate. Thus, the output splitting ratio 33%:66% of TE polarization may be obtained if the applied voltage (or corresponding index change) of EO being ±0.00026951 (which is the smallest) is achieved.

From this result as shown in FIGS. 10A and 10B, the intensity of the electric field in the y-axis may be evaluated according to equations 1 and 2 below. The term $\Delta n_e$, an index change due to Pockels effect, is determined by the electro-optic coefficient and the strength of the applied electric field. The ±sign of the index change in this configuration is not important and is dependent on the polarity of the voltage applied to the electrodes.

$$\Delta n_e = \frac{1}{2} r_{13} n_e^3 E_Y^e \quad (1)$$

$$E_Y^e = 1.70136 \frac{V}{\mu m} \quad (2)$$

By assuming an electrode geometry with a push-pull configuration as shown in FIG. 9 and variables such as a waveguide gap of 5 μm wide, an electrode gap of 5 μm wide, and a center electrode of 5 μm width, the required applied voltage for achieving EO of ±0.00026951 may be calculated to be $V_Y=8.5068$ V. This value should be less than a breakdown electric field of the Lithium Niobate in this illustrated embodiment, nearly 10 V/μm. The value should also approach the maximum allowable value of the index change will be $1.6\times10^{-3}$ if the largest index change is achieved by applying the electric field along the optical axis of Lithium Niobate such that the largest electro optic coefficient $r_{33}$ is utilized. According to this guideline and in this illustrated embodiment, the maximum voltage applicable to the electrode should be ±50V, which much larger than $V_Z=8.5068$ V, resulting in a required index change of $\pm 2.6951\times10^{-4}$, which is located within an acceptable range.

Figure 11:
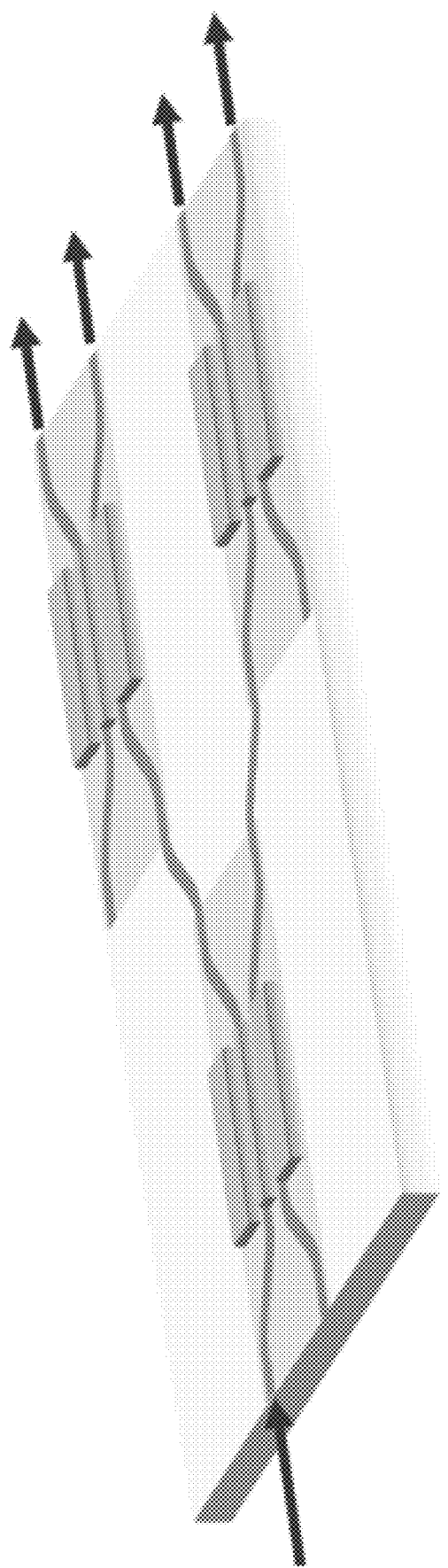
FIG. 11 is a representation of cascaded directional couplers of FIG. 9 forming an exemplary C-phase gate.

Based on this simulation process, waveguide parameters of the directional optical couplers having their outputs with TM:33%-TE:100%, and TM:100%-TE:33% may be directly found and a cascaded directional coupler circuit may be constructed as shown in FIG. 11.

The above illustrated directional couplers are drawn based on an assumption that the BPM simulation is accurate such that a fabricated waveguide coupler for TM polarization will yield the exact power splitting ratios such as designed TM=100%:0% or TM=33%:66% in a given geometry. If the fabricated waveguide performance does not match the ideal geometries of the simulation, the C-phase Gate may be not functioned as expected. Furthermore, temperature related characteristics of Lithium Niobate circuits can also induce errors in the precision control of the refractive index. Therefore, additional controls are needed to adjust polarization independently.

Thus, embodiments of the invention address this need by providing the ability to tune the TM and TE polarizations independently in a single coupler, which includes two optical waveguides on which two-section electrodes are formed.

Figure 12:
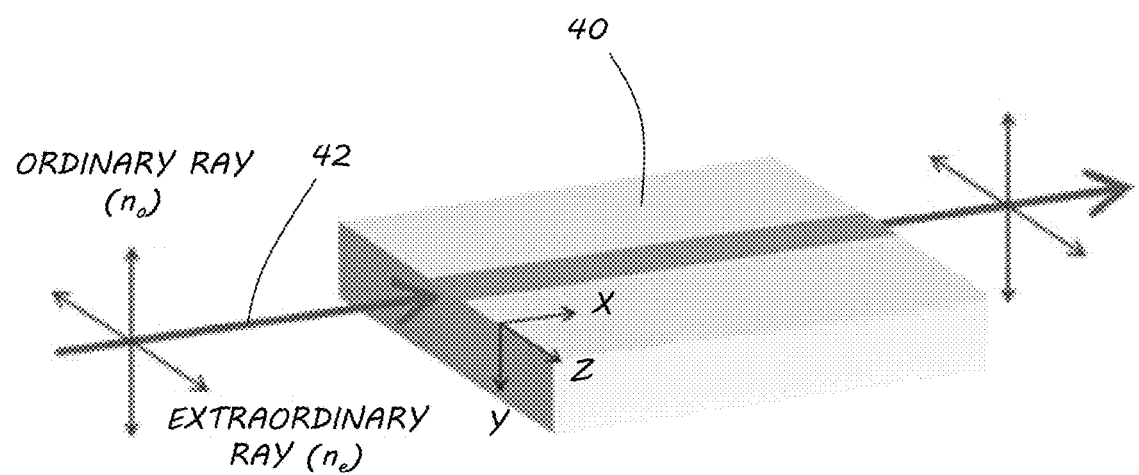
FIG. 12 is a schematic representation of an electric field applied along an optical axis in a y-cut, x-propagation $LiNbO_3$ substrate.
Figure 13:
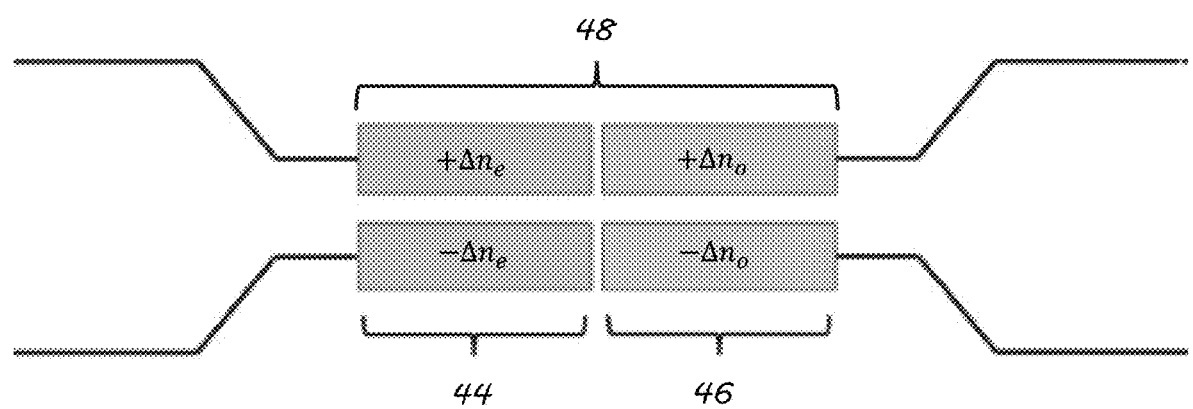
FIG. 13 is a schematic representation of an optical directional coupler with two-section electrodes.

A C-Phase Gate Circuit Based on a Directional Coupler with A Two-Segmented Electrode Configuration FIG. 12 shows the electric field applied to a LiNbO$_3$ substrate 40 along the optical axis where incident light 42 propagates along the x-axis, and the electric fields are $E_X=0$ and $E_Y=0$ ($E_Z\neq 0$). The index changes are characterized by deformation of the index ellipsoid with the applied electric field on the cross-section in the y-z plane normal to the x axis. FIG. 13 is a schematic diagram illustrating how index changes are introduced by the applied electric field. The first set of the electrodes 44 induces an index change along the z axis for an extraordinary wave, i.e., TE polarization. The second set of the electrodes 46 works for an ordinary wave, i.e., TM polarization. The two sets of the electrodes may be operated independently along the interaction length 48 to simultaneously control the desired optical power splitting ratio of each polarization at the end of waveguide.

When considering the electric field applied along the z axis while assuming the axes x, y, and z coincide with the principal axes, the equations describing the index ellipsoid do not include any cross-product terms. Since the index changes induced by the applied electric field are very small, the semi-axis lengths of the index ellipsoid in the y-z plane vary slightly with applied electric field $E_z$. Indexes $n_y$ and $n_z$ of the ordinary and extraordinary rays are as follows:

$$n_y = n_0 - \Delta n_0 \quad (3)$$

$$\Delta n_0 = \frac{1}{2} r_{13} n_0^3 E_z \quad (4)$$

$$n_z = n_e - \Delta n_e \quad (5)$$

$$\Delta n_e = \frac{1}{2} r_{33} n_e^3 E_z \quad (6)$$

Equations (4) and (6) above represent the index changes via the Pockels effect determined by the electro-optic coefficient and the strength of the applied electric field.

Now the electric field is applied along the y-axis of a Y-cut $LiNbO_3$. The index ellipsoid on the cross-section in the y-z plane normal to the x-axis becomes:

$$\left(\frac{1}{n_0^2 + r_{22}E_y}\right)y^2 + \left(\frac{1}{n_e^2}\right)z^2 + 2r_{51}E_y yz = 1 \quad (7)$$

Due to non-zero cross product term in the y-z plane, the x, y, and z axes are no longer the principal axes. So by rotating the y and z axes by the angle of axis rotation, θ, the cross-product of y-z is eliminated and the coordinate (x, y, z) is transformed to a new coordinate (x, Y, Z) which is the new principal axes of the index ellipsoid. $\Delta n_0$ of Eq. (4) and $\Delta n_e$ of Eq. (6) now become:

$$\Delta n_0 = \frac{1}{2}n_0^3 r_{22} E_y - \frac{n_0^3 (r_{51} E_y)^2}{(n_e^{-2} - n_0^{-2})} \quad (8)$$

$$\Delta n_e = \frac{n_e^3 (r_{51} E_y)^2}{(n_e^{-2} - n_0^{-2})} \quad (9)$$

The electro-optic coefficient $r_{22}$ is nearly one-tenth of $r_{33}$, and $n_e^3(r_{51}E_y)^2/n_e^{-2}-n_0^{-2}$ is about $10^{-5}$, which can be ignored. The applied electric field $E_y$ produces a non-vanishing off-diagonal component, which induces a small variation in the dielectric tensor. When a linearly polarized light moves along the y-axis, a small polarization variation in the z-direction for the extraordinary ray is produced by the electric field Ey for the ordinary ray. In other words, two orthogonal linearly polarized lights are coupled due to the principal axes rotation of the index ellipsoid. However, in the illustrated embodiment, the rotation angle is very small (<<1°), and the side effect of the TE-TM mode conversion does not occur due to an improper phase matching condition, which is not satisfied.

From the table in FIG. 6, it can be found that only two points, i.e., located at L=1421.1 μm and L=4038.0 μm for the illustrated embodiment, are available points for achieving a power splitting ratio of TM 33%:66%. Beyond these points the required applied voltage would likely exceed the breakdown voltage, which, as set out above, is not desirable. From a BPM simulation, these two points (L=1421.1 μm and L=4038.0 μm) resulted in the same patterns. An interaction length of L=4038.0 um was chosen in another exemplary embodiment to make a coupler having TM 33%:66%.

An exemplary directional coupler 50 with a two section electrode configuration is shown in FIG. 14. There are two regions that have different electrode geometries providing different modulation functions. The electrode 52 having an electrode configuration as shown in FIG. 15A provides an index control for the extraordinary wave, while the electrode 54 having an electrode as shown in FIG. 15B performs an index control for the ordinary wave.

In a C-phase Gate, two different directional couplers designed to provide power splitting ratios of TM T:R=33%:66% (TE T:R=100%:0%) and TM T:R=100%:0% (TE T:R=33%:66%) are generally required. Due to the significant difference in the electro optic tensor between $r_{33}$ and $r_{22}$, the BPM simulation should be optimized for the TM mode behavior first as set out above, and then simulate the TE mode behavior.

With the illustrative coupler as shown in FIG. 14, which has set to produce an initial condition having TM T:R=33%: 66%, it is possible to determine the operation points that exhibit an optical power splitting ratio of TE T:R=100%:0% by changing the index of refraction. In this exemplary case, the background index is changed to 2.1748 for extra-ordinary wave input.

Figure 16:
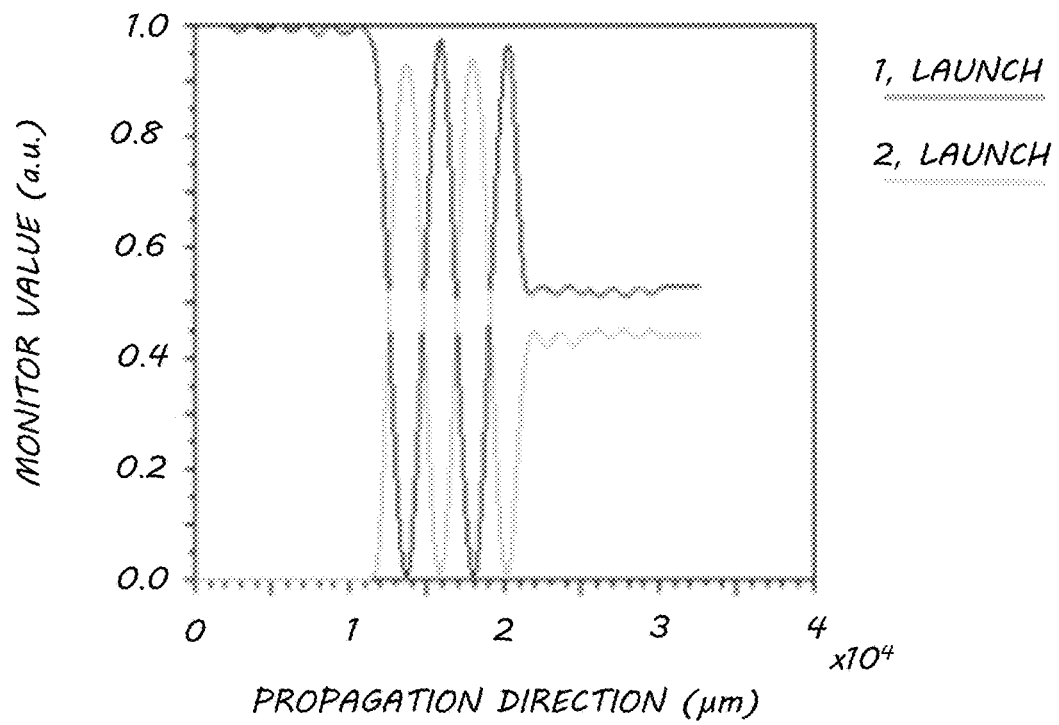
FIG. 16 contains a graph from an initial BPM simulation of a directional couple with two-section electrodes consistent with embodiments of the invention.

The exemplary directional coupler with two-section electrodes is constructed in a similar fashion as shown in the FIGS. 14, 15A, and 15B. The length of the electrode used here is L=4038 μm as determined above. The initial coupler performance with only light incident of TM polarization is shown in the graph in FIG. 16. The electrode lengths for the electrodes 52, 54 in FIG. 14 are both set to be 4038 μm long. The initial resulting power splitting ratio is TM T:R=52.98%:44.26%, close to a point of 50:50 operation.

Figure 17A:
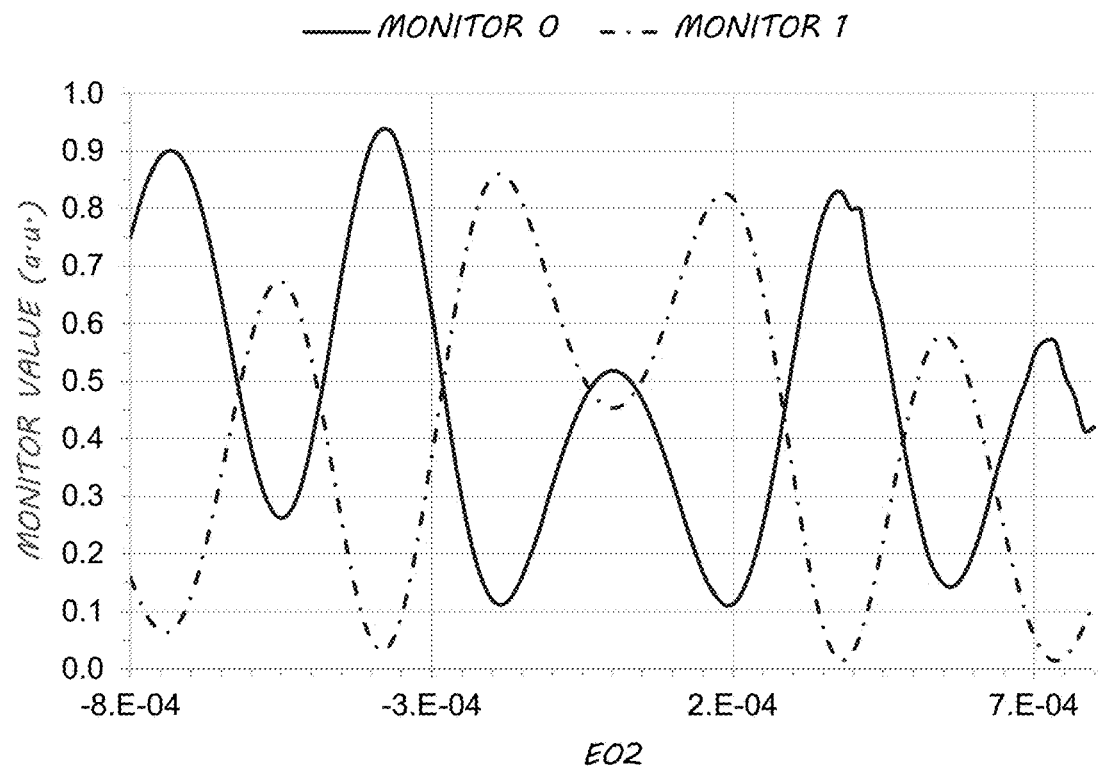
FIG. 17A contains a graph of a BPM simulation of a coupler to find a power splitting ratio of TM T:R=33%:66%.
Figure 17B:
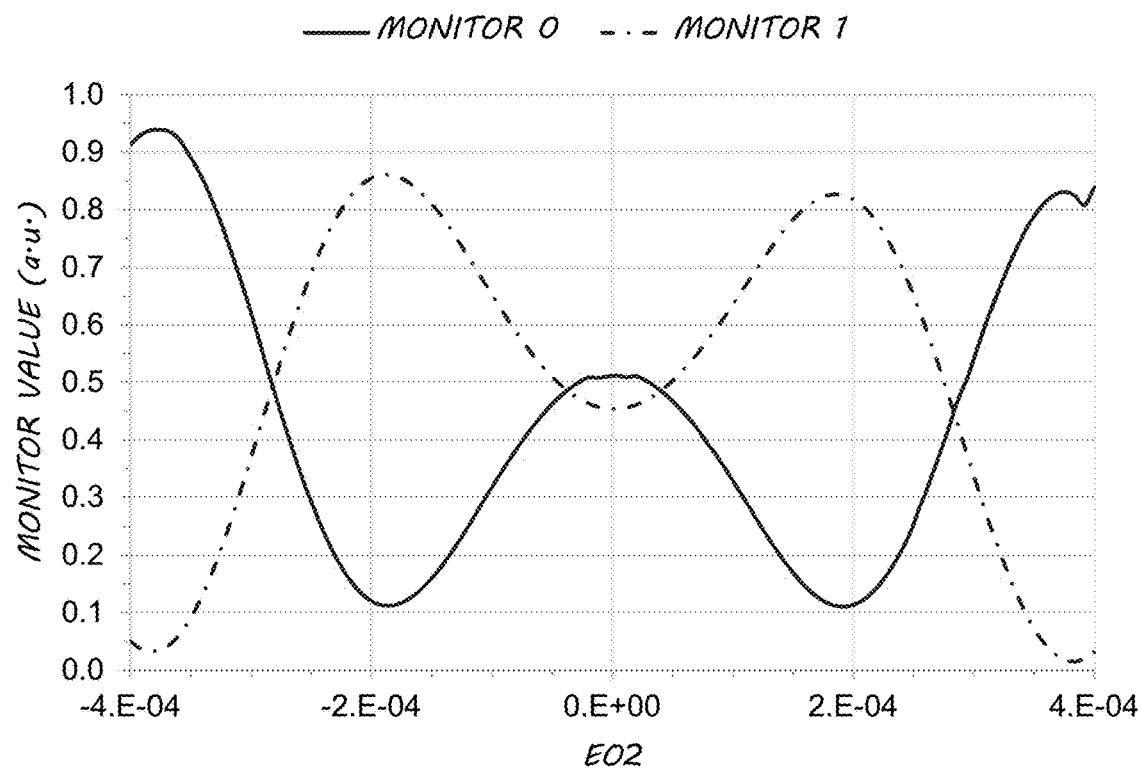
FIG. 17B contains a portion of the graph of FIG. 17A.

Next, the voltage on the electrode 52 is set to 0, and the voltage on electrode 54 is set to vary in order to see the behavior of the power splitting ratio as a function of the index change, which corresponds to the applied voltage on the electrode 54. As shown in FIG. 17, there are four spots that give a desired power splitting ratio of TM T:R=33%: 66%; for example, EO2=0.10357×10⁻⁴, 2.6224×10⁻⁴, −9.7696×10⁻⁴, and −2.5636×10⁻⁴. Among these available points, EO2=2.6224×10⁻⁴ and EO2=−2.5636×10⁻⁴ are the most promising due to the breakdown electric fields. EO2=2.622×10⁻⁴ (the index change, $\Delta n_0$) requires the electric field applied via electrode 54. The required electric field is calculated to be $E_y$=13.4 V/μm, which looks much higher than the dielectric breakdown field (10V/μm). However, in the exemplary design, the electrode is configured in a push-pull configuration, which reduces the $E_y$ to 6.735 V/μm, which is again below the breakdown electric field. Thus, the optical directional coupler with TM T:R=33%: 66% can be achieved even if the initial operation condition is off the optimum condition.

Figure 18:
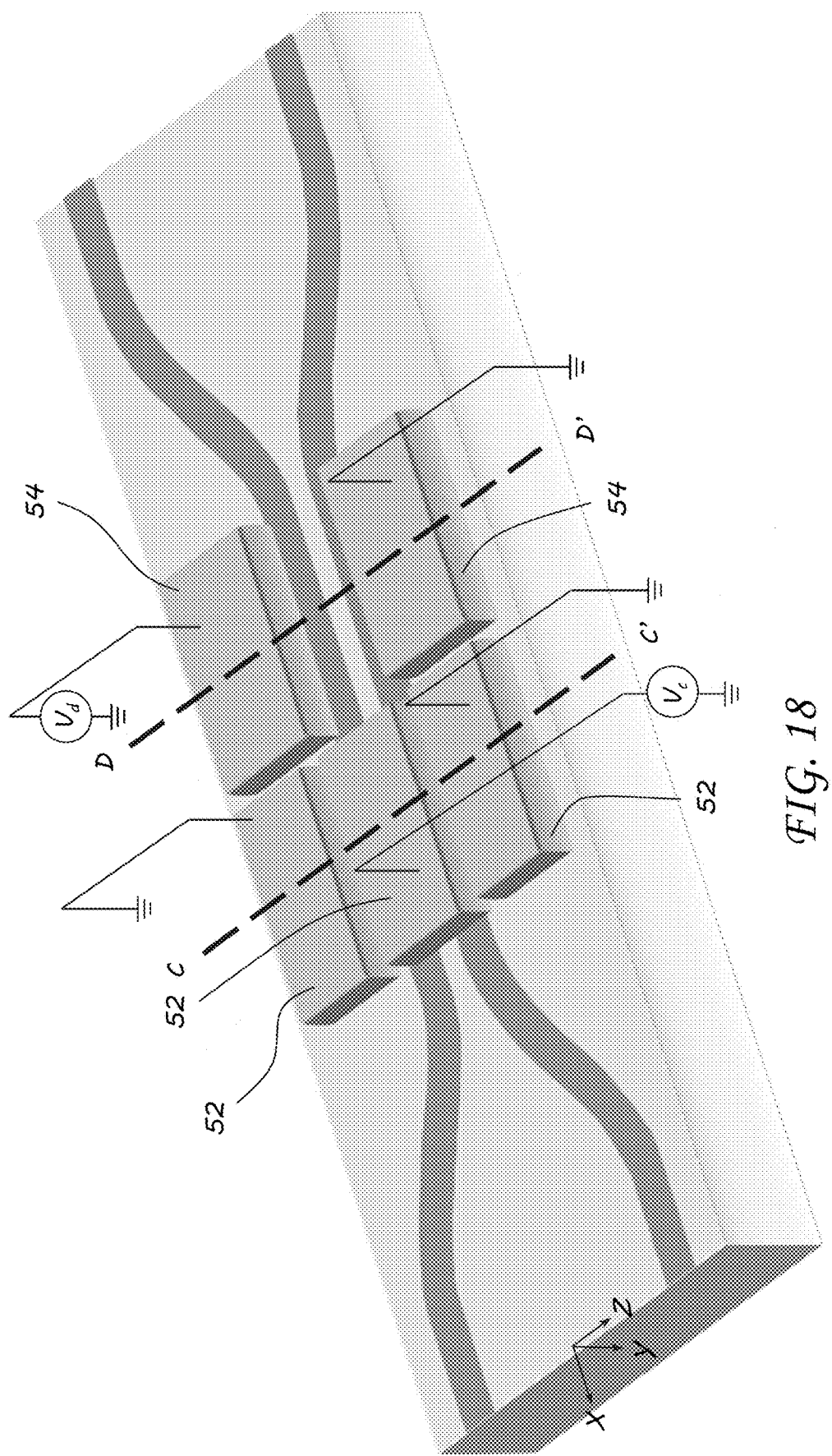
FIG. 18 is a schematic representation of a basic building block of a C-Phase Gate based on the directional coupler of FIG. 14.
Figure 19A:
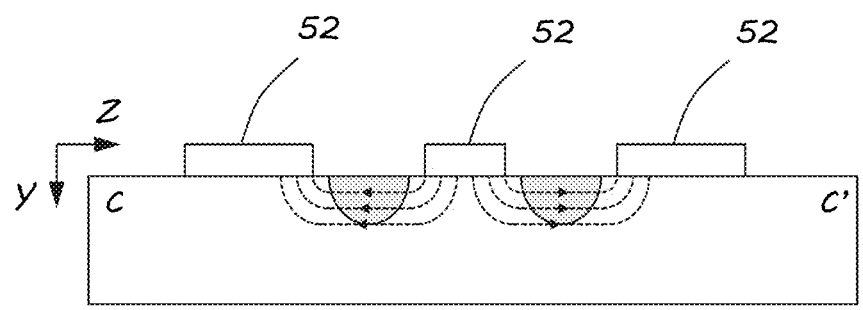
FIG. 19A is a cross section of the schematic of FIG. 18 through C-C'.
Figure 19B:
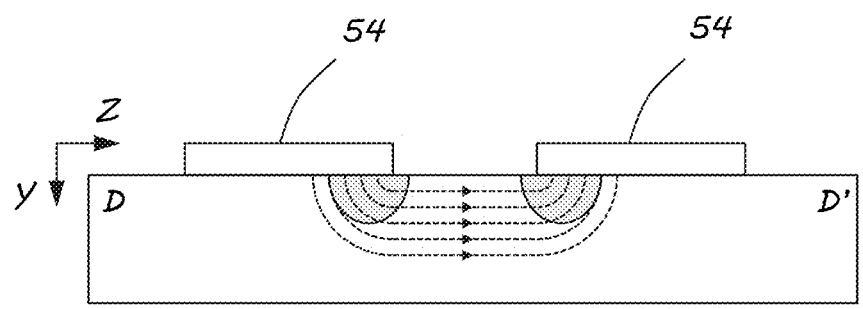
FIG. 19B is a cross section of the schematic of FIG. 18 through D-D'.
Figure 20A:
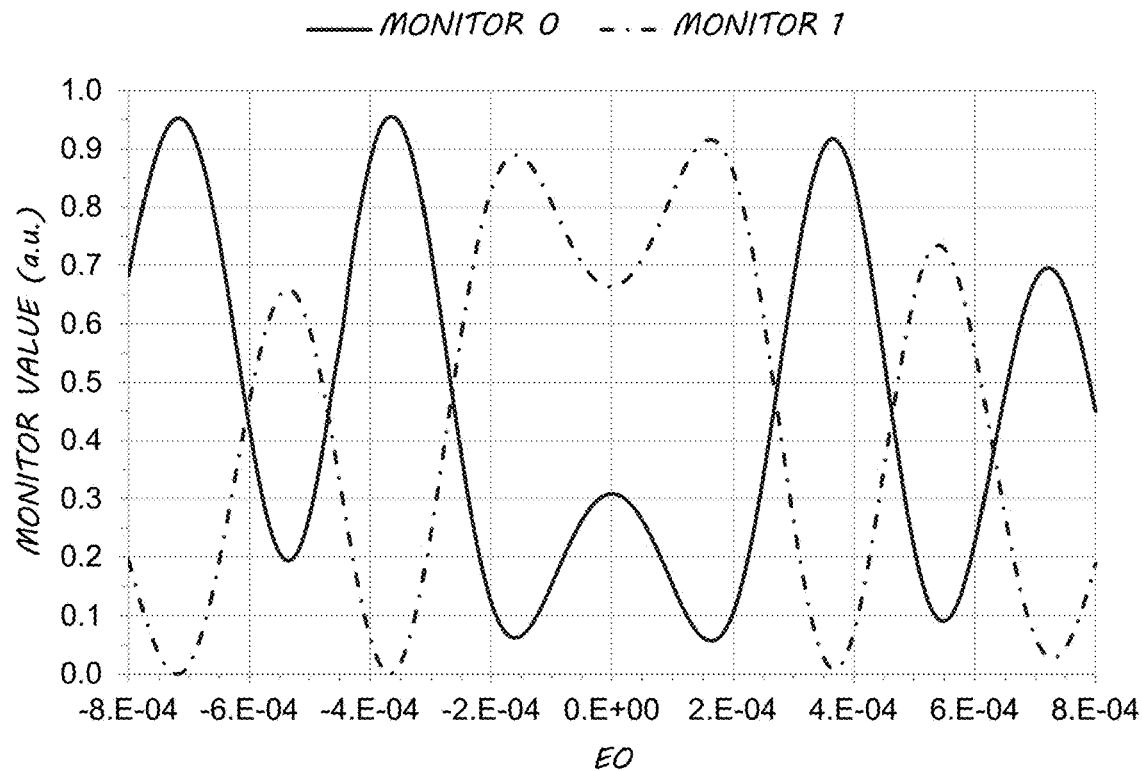
FIG. 20A contains a graph of a BPM simulation of a coupler to find a power splitting ratio of TE T:R=100%:0%.
Figure 20B:
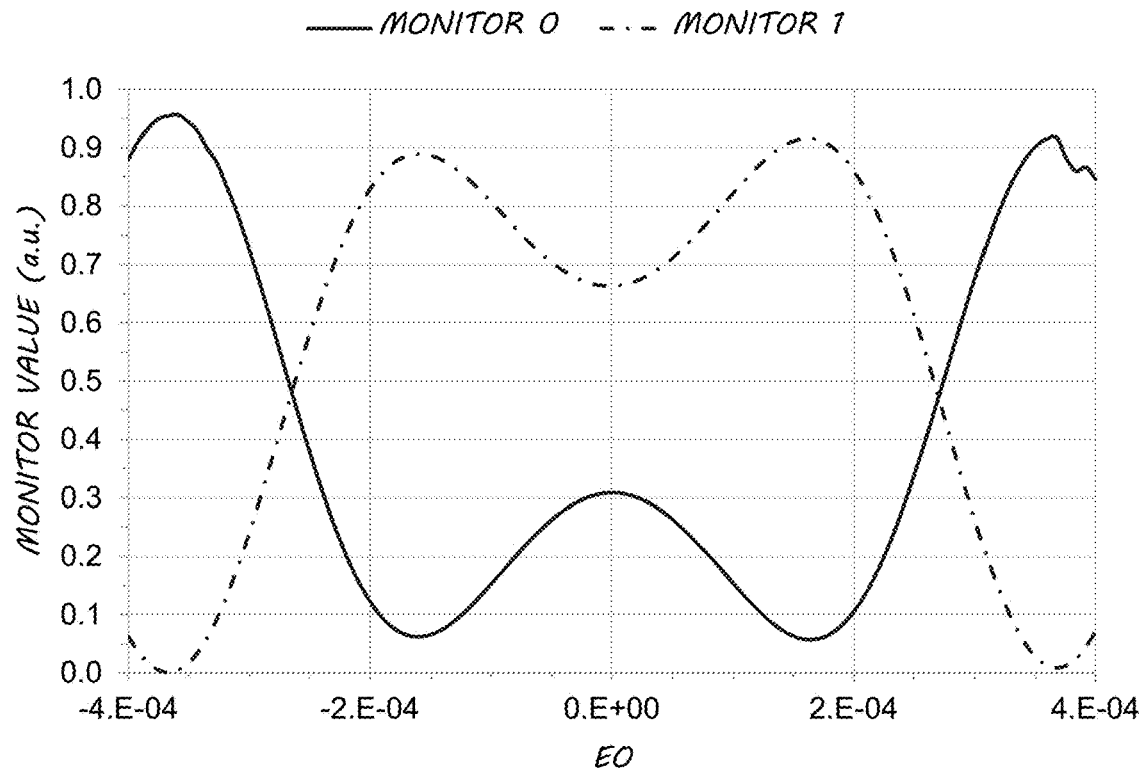
FIG. 20B contains a portion of the graph of FIG. 20A.

Because the two polarizations are orthogonally distributed, there should be no overlap between two electric fields. Therefore, by turning off electrode 54 ($V_d$), and operating the electrode 52 ($V_c$), which is shown in FIGS. 18, 19A, and 19B, the optical directional coupler can be tuned to achieve TE T:R=100%:0%. Thus, with the voltage on electrode 54 set to zero, the optical power splitting behavior as a function of the index change (EO=$\Delta n_e$) is depicted in FIGS. 20A and 20B. As can be seen in the figures, two points are available for achieving TE T:R=100%:0%, which are located at EO=$\Delta n_e$=−3.7095×10⁻⁴ and +3.6948×10⁻⁴. For example, $\Delta n_e$=−3.7095×10⁻⁴ requires the electric field strength in the z-axis to be 2.34 V/μm. This can be easily achievable because it is well below the breakdown electric field.

Figure 21A:
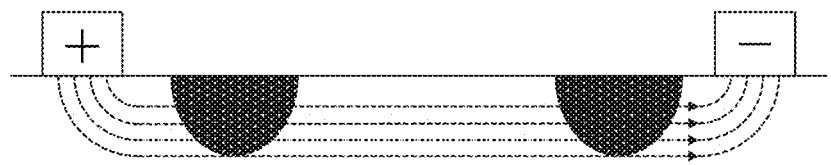
FIGS. 21A-21D illustrate alternative electrode placements to achieve electric fields directed along the z-axis and along the y-axis.
Figure 21B:
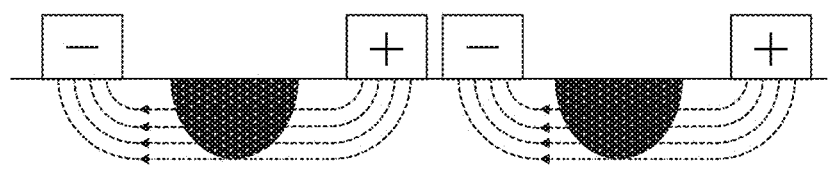
Figure 21C:
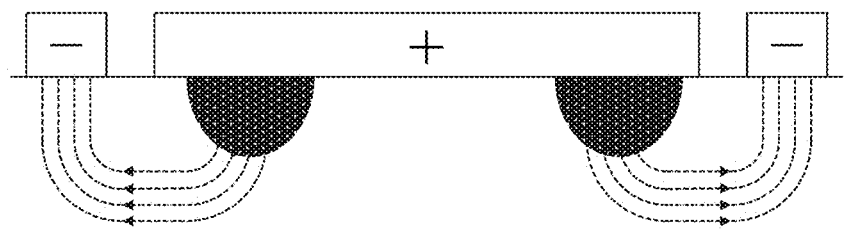
Figure 21D:
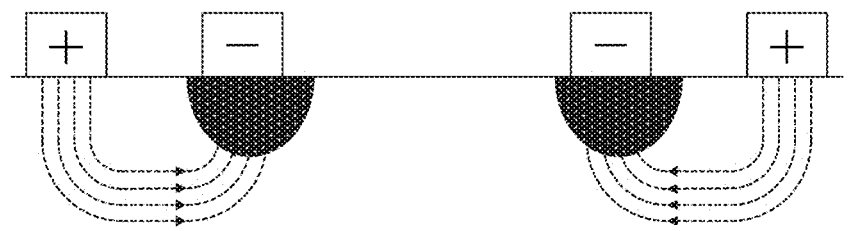

Alternate configurations of the electrodes 52, 54 may be seen in FIGS. 21A-21D. FIG. 21A illustrates a two electrode configuration operable to produce an electric filed directed along a Z axis with respect to the waveguide. Similarly, the four electrode configuration also produces an electric field along a Z axis. The additional electrodes are added such that the direction of the electric field is the same across each of the waveguides. FIG. 21C illustrates a three electrode configuration that produces an electric field along the Y axis with respect to the waveguide. And, similarly, the four electrode configuration in FIG. 21D, also produces an electric field along the Y axis. The additional electrode is added such that the direction of the electric field (similar to FIGS. 21A and 21B) is the same across each of the waveguides. Placement and number of electrodes may be a design parameter taken into account when designing the tunable C-Phase Gates.

Figure 22:
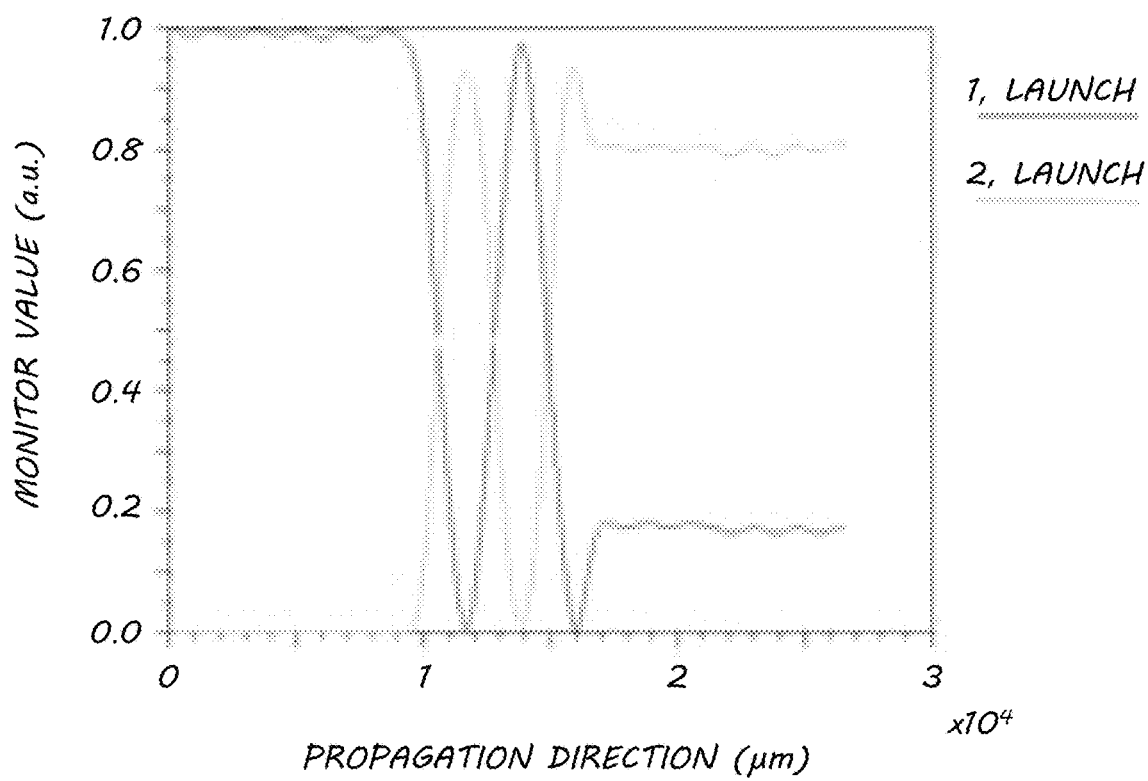
FIG. 22 contains a graph of a BPM simulation of an alternate configurations of a coupler with two-segment electrode lengths of 2730 μm.

By extension, and based on data obtained from the table in FIG. 6, an electrode length was chosen to be L=2730 um for construction of a coupler having TM T;R=100%:0% and a configuration with two segment electrodes similar to that of FIG. 14. FIG. 22 shows an initial optical coupling behavior when there is no applied voltage on both electrodes. The initial power distribution for TM polarization is TM T:R=17%:80%.

Figure 23A:
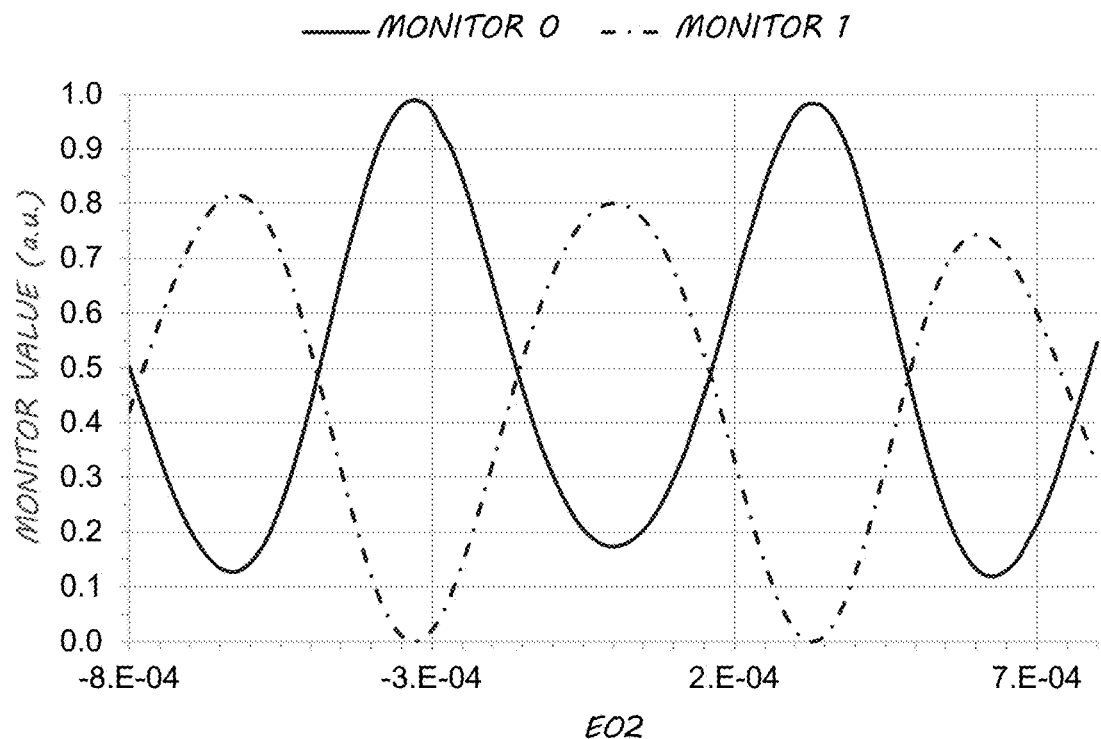
FIG. 23A contains a graph of a BPM simulation of the coupler in FIG. 22 to find a power splitting ratio of TM T:R=100%:0%.
Figure 23B:
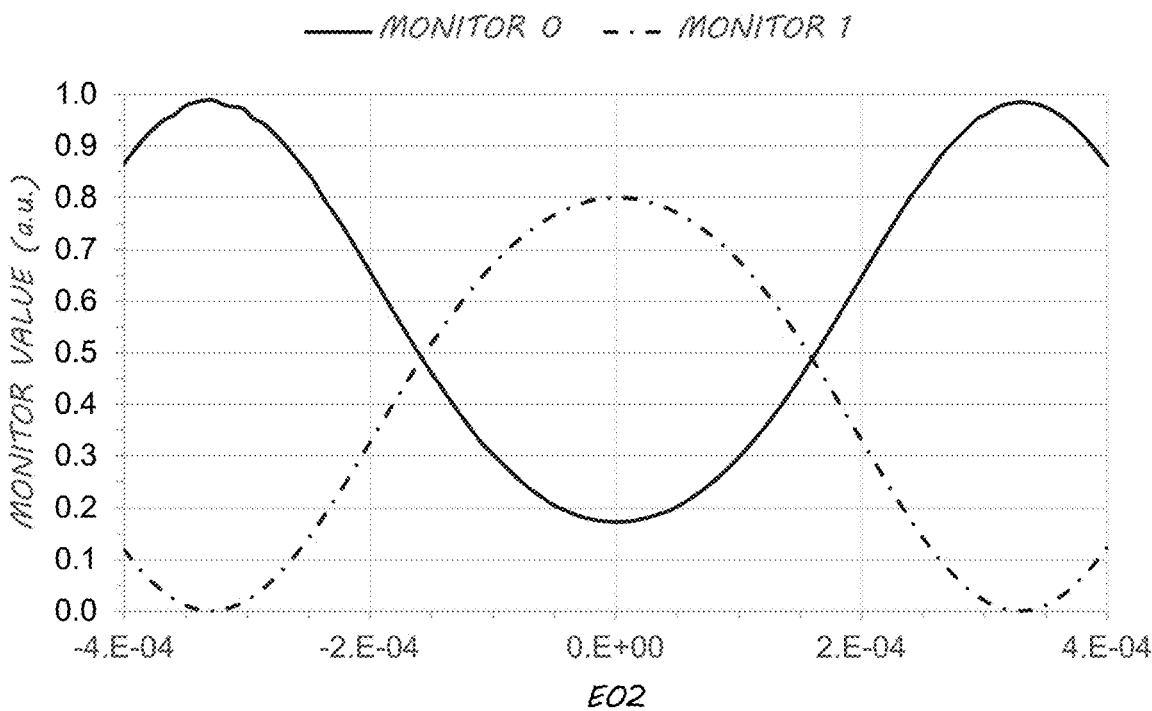
FIG. 23B contains a portion of the graph of FIG. 23A.
Figure 23C:
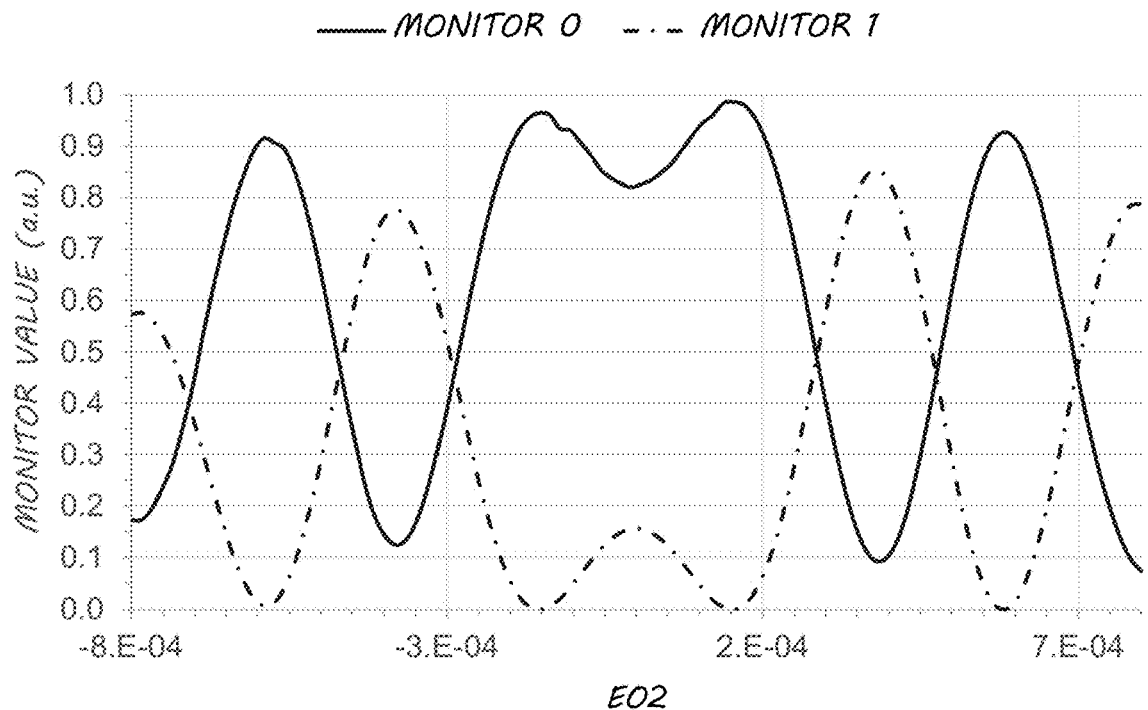
FIG. 23C contains a graph of a BPM simulation of the coupler in FIG. 23A to find the TE power splitting ratio with a different x-axis scan value.
Figure 23D:
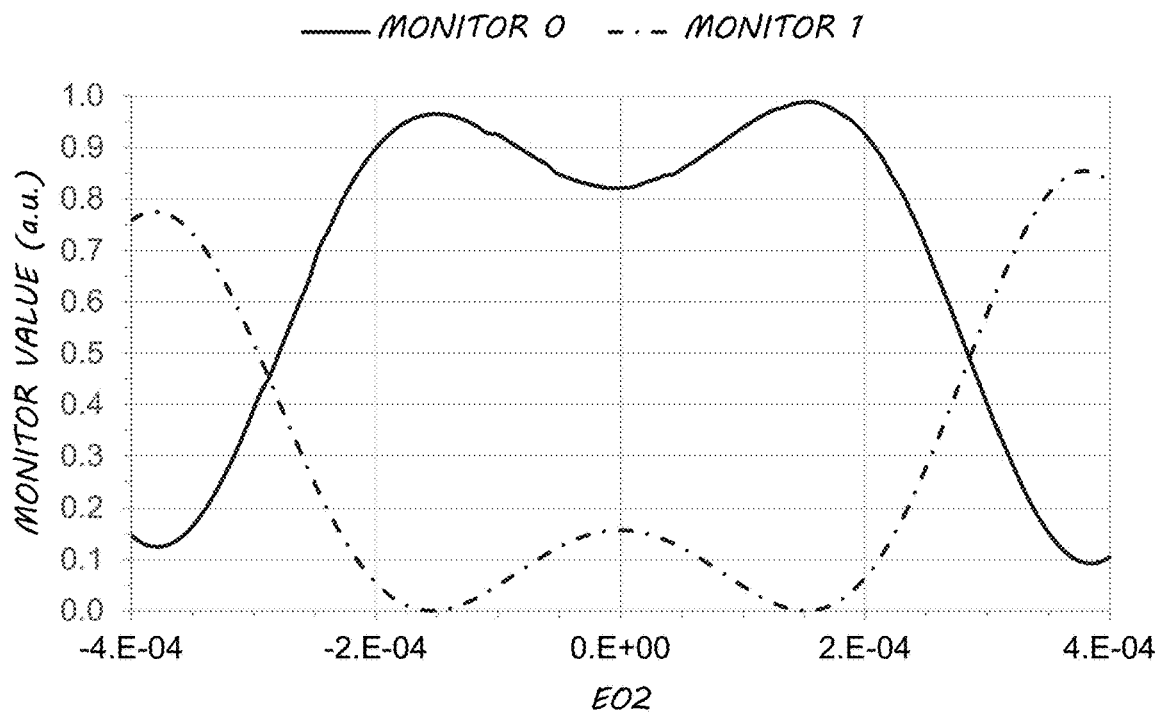
FIG. 23D contains a portion of the graph of FIG. 23C.

Applying a driving voltage to electrode II (electrode 54 in FIG. 14) provides the optical power splitting behavior of TM polarization. The simulated results are shown in FIGS. 23A and 23B. There are only two points available that can provide the power splitting ratio of TM T:R=100%:0% with relatively low electric field strength. Two points are located at $\pm 3.3129 \times 10^{-4}$ for TM T:R=100%:0% and $\pm 1.1386 \times 10^{-4}$, which can be used to provide TM T:R=33%:66% as well. However, with this configuration, the change of the refractive index, i.e., $EO2=\Delta n_0=3.3129 \times 10^{-4}$, requires electric field strength to be 17.018V/um that results in 85.090V of applied voltage and it is higher than expected. Therefore, by increasing the length of the electrode II by 750 um long, TM T:R=100%:0% can be also alternatively obtained at $EO2=\Delta n_0=1.54 \times 10^{-4}$, resulting in $E_y=7.9106$ V/μm and applied voltage of 39.55[V]. Thus, TM T:R=100%:0% may be realized by manipulating the length of the electrode II (electrode 54 in FIG. 14).

Figure 24A:
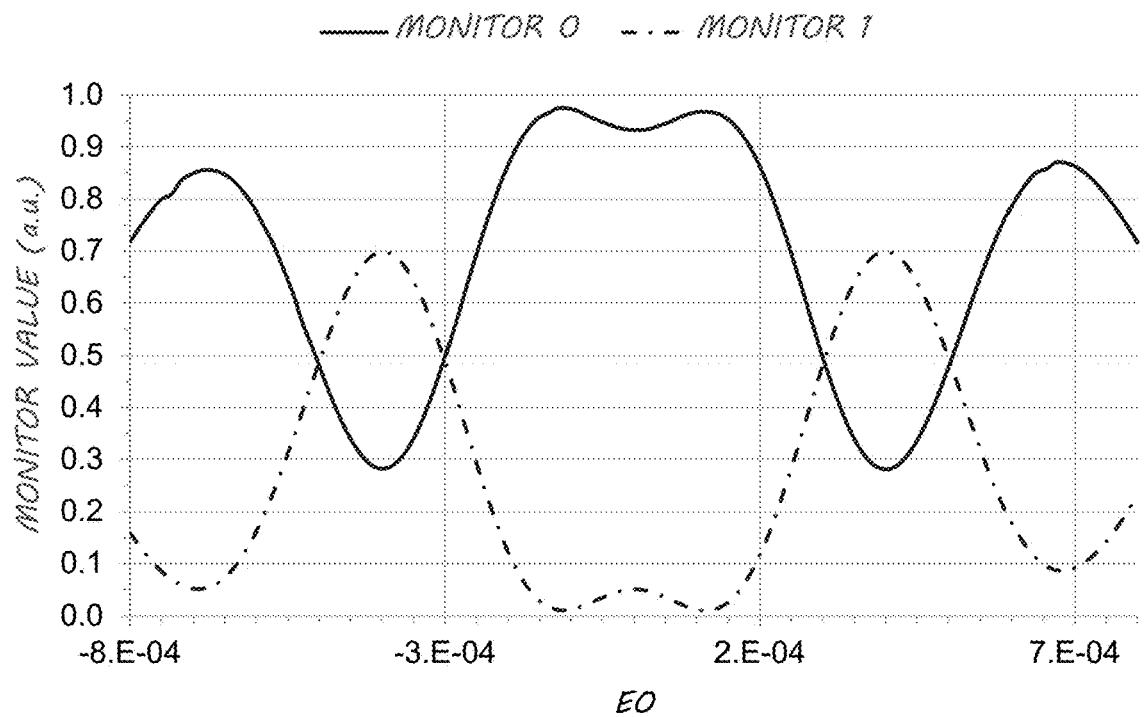
FIG. 24A contains a graph of a BPM simulation of the coupler in FIG. 22 to find a power splitting ratio of TE T:R=33%:66% along.
Figure 24B:
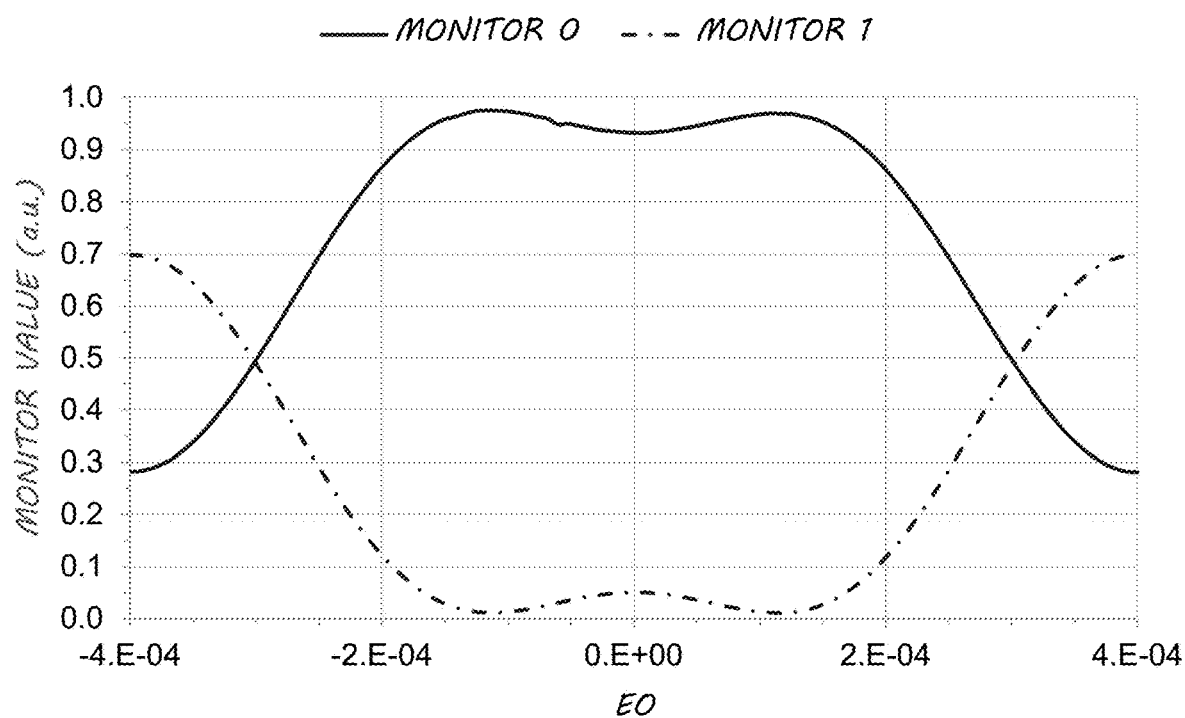
FIG. 24B contains a portion of the graph of FIG. 24A.

Again, as set out above, with the voltage on the electrode II (electrode 54 in FIG. 14) set to zero, the optical power splitting behavior as a function of the index change ($EO=\Delta n_e$) is depicted in FIGS. 24A and 24B. As can be seen in the figures, two points are available for achieving TE T:R=33%:66% which are located $EO=\Delta n_e=\pm 3.5444 \times 10^{-4}$. The electric field strength in the z-axis should be 2.2375 V/μm, resulting in 11.187V of driving voltage, thus achieving TE T:R=33%:66%.

Constructing the C-Phase Gate Based on Directional Couplers

Figure 25:
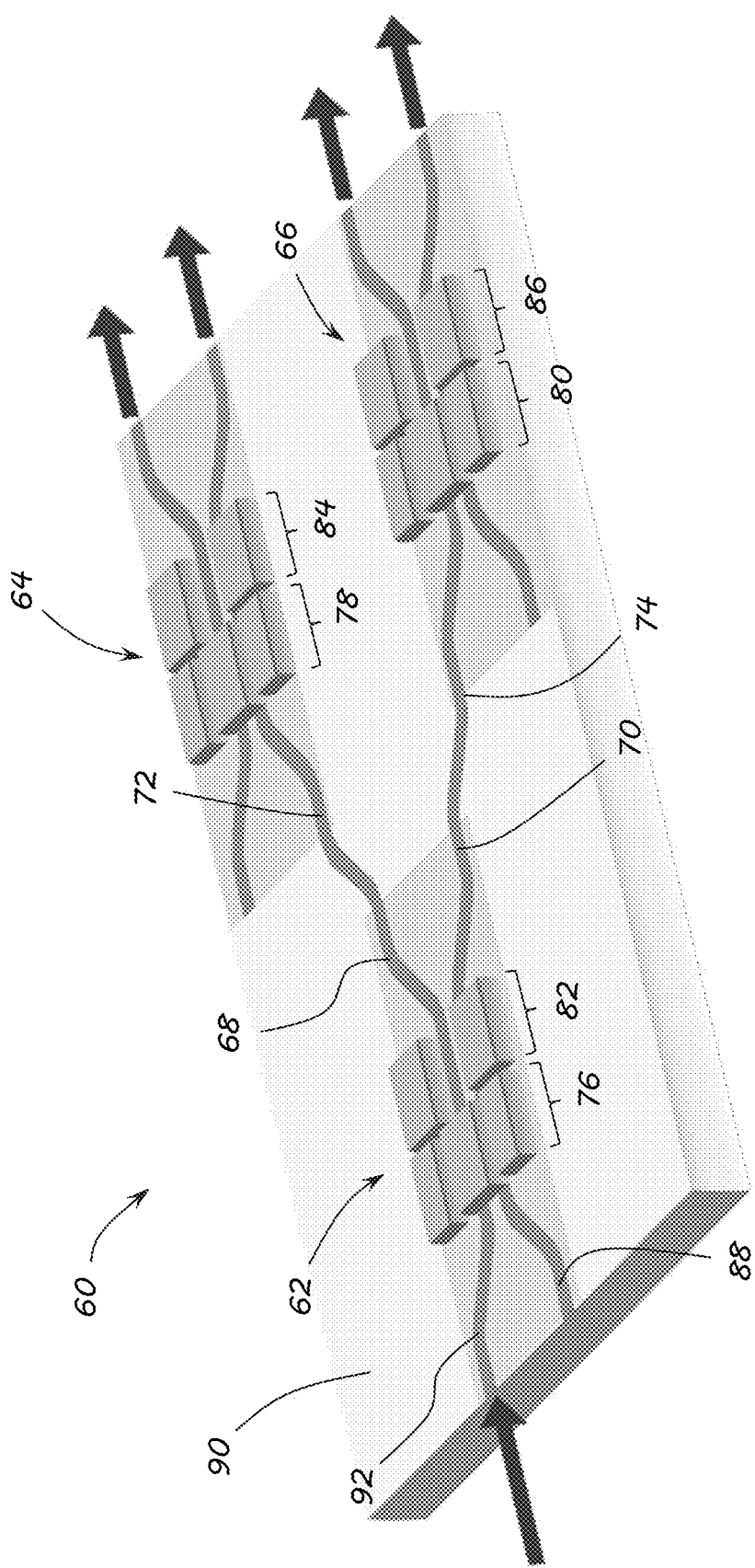
FIG. 25 is a schematic representation of a C-Phase Gate consistent with embodiments of the invention.

Finally, the main portion of the C-phase Gate 60 may now be constructed as shown in FIG. 25. Each directional coupler 62, 64, 66 can control their corresponding waves independently in two optical waveguide geometries. Three elements of optical directional couplers are connected in series and in parallel by connecting each output 68, 70 of coupler 62 to an input 72, 74 of couplers 64, 66, respectively. Each of the directional couplers 62, 64, 66 has two sets of electrodes for controlling TE (76, 78, 80) and TM (82, 84, 86) polarization, respectively. When the electrodes are fabricated as shown, the resultant applied electric fields will be dominantly parallel to the Z-axis in the first waveguide 88 (TE control) and vertical to the wafer surface 90 in the second waveguide 92 (TM control). Thus, the electro-optic effect is strongest when the applied electric field is parallel to the Z-axis in the first waveguide, and it is approximately one third of the strongest electro-optic effect when the electric field is vertical to the wafer surface. This is a reason why the waveguide dimensions are first optimized for TM polarization in order to reduce a required voltage to obtain a desired amount of the index change. Though, the relative orientations between the crystal axis and the polarization directions of the propagating modes are not switched; however, due to the configurations of the electrodes, a TE mode would be dominantly parallel to the Z-axis in the first electrode, and a TM mode would be dominantly parallel to the applied electric field (vertical direction with Y-axis). As a result, both propagating modes would have experienced the different amounts of electro-optic effect after having propagated through the channel waveguide in a coupler structure.

As shown in FIG. 25, one set of electrodes creates a TE electric field that modulates the TE optical index through the $r_{33}$ coefficient of the crystal, while another segment creates a TM electric field that modulates the TM optical index through the $r_{22}$ coefficient. While both changes also affect the opposite optical modes, those effects are significantly lower, due to the orthogonal arrangement of the electric fields and the different values of the electrooptic coefficients in their corresponding directions. Tuning is iterative in nature. First, the TE voltage is applied to the TE electrodes that will tune the TE optical mode to the right coupling length. This, however, slightly detunes the TM optical mode, though the effect is much smaller. In the next step, the TM voltage is applied to the TM electrode set to correct the TM optical mode coupling length. This would also detune the TE optical mode, but once again, to a much smaller effect. Within a few steps of back and forth, voltage adjustments on the TE and TM electrodes will eventually achieve the corrections of coupling lengths for both TE and TM optical modes at the same time and achieve the desired coupling ratios independently from one polarization to the other. For example, in the illustrated embodiment in FIG. 25, this may include % T of H=100% and % T of V=33% for coupler 62 and % T of H=33% and % T of V=100% for couplers 64 and 66.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art, for example, making the switch polarization insensitive or reducing the driving voltage. The invention in its broader aspects is therefore not limited to the specific details, representative apparatus and method, and illustrative examples shown and described. Accordingly, departures may be made from such details without departing from the scope of the general inventive concept.

What is claimed is:

1. An electro-optical directional coupler, comprising:
a substrate;
a first optical waveguide formed on the substrate;
a second optical waveguide formed on the substrate, the second optical waveguide extending adjacent to and parallel with the first optical waveguide for at least one interaction length;
the at least one interaction length having a first end and a second end such that an optical signal applied only to one of the first and second optical waveguides couples to the other of the first and second optical waveguides between the first end and second end;
a first electrode comprising first, second, third, and fourth voltage sources, the first electrode proximate the first and second optical waveguides and positioned between the first end and second end of the interaction length such that a first voltage applied to the first electrode independently tunes a coupling of a TE mode, the first electrode configured to produce a horizontal E-field through the first and second optical waveguides; and
a second electrode proximate the first and second optical waveguides and the first electrode and positioned between the first end and second end of the interaction length such that a second voltage applied to the second electrode independently tunes a coupling of a TM mode, wherein the independent tuning from the first and second applied voltages simultaneously controls the coupling of the TM and TE modes, wherein the second and third voltages sources are positioned on the substrate such that the second and third voltage sources are between the first and second optical waveguides, and wherein the first and fourth voltages are positioned on the substrates such that the first and second optical waveguides and the second and third voltage sources are between the first and fourth voltage sources, producing horizontal electric fields across the first and second optical waveguides.

2. The electro-optical directional coupler of claim 1, wherein the substrate is made of a material selected from a group consisting of: Lithium Niobate, EO polymer, QD/QW III-V, and combinations thereof.

3. The electro-optical directional coupler of claim 1, wherein the first and second optical waveguides are titanium in-diffused lithium niobate optical waveguides.

4. An electro-optical directional coupler, comprising:
a substrate;
a first optical waveguide formed on the substrate;
a second optical waveguide formed on the substrate, the second optical waveguide extending adjacent to and parallel with the first optical waveguide for at least one interaction length;
the at least one interaction length having a first end and a second end such that an optical signal applied only to one of the first and second optical waveguides couples to the other of the first and second optical waveguides between the first end and second end;
a first electrode proximate the first and second optical waveguides and positioned between the first end and second end of the interaction length such that a first voltage applied to the first electrode independently tunes a coupling of a TE mode; and
a second electrode comprising first, second, and third voltage sources, the second electrode proximate the first and second optical waveguides and the first electrode and positioned between the first end and second end of the interaction length such that a second voltage applied to the second electrode independently tunes a coupling of a TM mode, the second electrode configured to produce a vertical E-field through the first and second optical waveguides,
wherein the independent tuning from the first and second applied voltages simultaneously controls the coupling of the TM and TE modes, and
wherein the first voltage source is positioned on the substrate above the first and second optical waveguides and the second and third voltage sources are positioned on the substrate such that the first and second optical waveguides and the first voltage source are between the second and third voltage sources, producing a vertical electric field across the first and second optical waveguides.

5. A C-Phase Gate, comprising:
a substrate;
a first electro-optical directional coupler having a first and second input and a first and second output, the first electro-optical directional coupler including:
a first optical waveguide positioned on the substrate between the first input and first output of the first electro-optical directional coupler;
a second optical waveguide positioned on the substrate between the second input and second output of the first electro-optical directional coupler, the second optical waveguide extending adjacent to and parallel with the first optical waveguide for at least one first interaction length;
the at least one first interaction length having a first end and a second end such that an optical signal applied only to one of the first and second optical waveguides couples to the other of the first and second optical waveguides between the first end and second end;
a first electrode proximate the first and second optical waveguides and positioned between the first end and second end of the at least one first interaction length such that a first voltage applied to the first electrode tunes a coupling of a TE mode; and
a second electrode proximate the first and second optical waveguides and the first electrode and positioned between the first end and second end of the at least one first interaction length such that a second voltage applied to the second electrode tunes a coupling of a TM mode,
wherein the tuning from the first and second applied voltages simultaneously controls the coupling of the TM and TE modes;
a second electro-optical directional coupler having a first and second input and a first and second output, the second electro-optical directional coupler including:
a third optical waveguide positioned on the substrate between the first input and first output of the second electro-optical directional coupler;
a fourth optical waveguide positioned on the substrate between the second input and second output of the second electro-optical directional coupler, the fourth optical waveguide extending adjacent to and parallel with the third optical waveguide for at least one second interaction length;
the at least one second interaction length having a first end and a second end such that an optical signal applied only to one of the third and fourth optical waveguides couples to the other of the third and fourth optical waveguides between the first end and second end;
a third electrode proximate the third and fourth optical waveguides and positioned between the first end and second end of the at least one second interaction length such that a third voltage applied to the third electrode tunes a coupling of a TE mode; and
a fourth electrode proximate the third and fourth optical waveguides and the third electrode and positioned between the first end and second end of the at least one second interaction length such that a fourth voltage applied to the fourth electrode tunes a coupling of a TM mode,
wherein the tuning from the third and fourth applied voltages simultaneously controls the coupling of the TM and TE modes;
a third electro-optical directional coupler having a first and second input and a first and second output, the third electro-optical directional coupler including:
a fifth optical waveguide positioned on the substrate between the first input and first output of the third electro-optical directional coupler;
a sixth optical waveguide positioned on the substrate between the second input and second output of the third electro-optical directional coupler, the sixth optical waveguide extending adjacent to and parallel with the fifth optical waveguide for at least one third interaction length;

the at least one third interaction length having a first end and a second end such that an optical signal applied only to one of the fifth and sixth optical waveguides couples to the other of the fifth and sixth optical waveguides between the first end and second end;

a fifth electrode proximate the fifth and sixth optical waveguides and positioned between the first end and second end of the at least one third interaction length such that a fifth voltage applied to the third electrode tunes a coupling of a TE mode; and a sixth electrode proximate the fifth and sixth optical waveguides and the fifth electrode and positioned between the first end and second end of the at least one third interaction length such that a sixth voltage applied to the sixth electrode tunes a coupling of a TM mode, wherein the tuning from the fifth and sixth applied voltages simultaneously controls the coupling of the TM and TE modes; and wherein the first input and second input of the first electro-optical directional coupler are configured to receive one or more input signals, and wherein the first output of the first electro-optical directional coupler is connected to the second input of the second electro-optical directional coupler, and wherein the second output of the first electro-optical directional coupler is connected to the first input of the third electro-optical directional coupler.

6. The C-Phase Gate of claim 5, wherein the substrate is made of a material selected from a group consisting of: Lithium Niobate, EO polymer, QD/QW III-V, and combinations thereof.

7. The C-Phase Gate of claim 5, wherein the first, second, third, fourth, fifth, and sixth optical waveguides are titanium in-diffused lithium niobate optical waveguides.

8. The C-Phase Gate of claim 5, wherein the first, third, and fifth electrodes are configured to produce a horizontal E-field through the respective first and second, third and fourth, and fifth and sixth optical waveguides.

9. The C-Phase Gate of claim 8, wherein the horizontal E-field produced in the first electro-optical directional coupler results in a % T of H=100% and the horizontal E-fields produced in the second and third electro-optical directional couplers result in a % T of H=33%.

10. The C-Phase Gate of claim 5, wherein the second, fourth, and sixth electrodes are configured to produce a vertical E-field through the respective first and second, third and fourth, and fifth and sixth optical waveguides.

11. The C-Phase Gate of claim 10, wherein the vertical E-field produced in the first electro-optical directional coupler results in a % T of V=33% and the vertical E-fields produced in the second and third electro-optical directions couplers result in a % T of V=100%.

* * * * *